US012652632B2

(12) United States Patent
Turner et al.

(10) Patent No.: US 12,652,632 B2
(45) Date of Patent: Jun. 9, 2026

(54) EXTENDED PERSONAL AREA NETWORK TIME SYNCHRONIZATION BETWEEN A WIRELESS COMMUNICATION DEVICE AND A PERIPHERAL DEVICE

(71) Applicant: QUALCOMM Incorporated, San Diego, CA (US)

(72) Inventors: Richard Turner, Belfast (GB);
Gopinath Patra, Bangalore (IN);
Laurent Wojcieszak, Belfast (GB);
Derrick Rea, Broughshane (GB)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 18/453,971

(22) Filed: Aug. 22, 2023

(65) Prior Publication Data

US 2025/0071707 A1     Feb. 27, 2025

(51) Int. Cl.
*H04W 56/00*        (2009.01)
*H04W 84/12*        (2009.01)
(52) U.S. Cl.
CPC ..... *H04W 56/002* (2013.01); *H04W 56/0055* (2013.01); *H04W 84/12* (2013.01)
(58) Field of Classification Search
CPC ........... H04W 56/001; H04W 56/0015; H04W 56/002; H04W 56/0055; H04W 84/12
See application file for complete search history.

(56) References Cited

U.S. PATENT DOCUMENTS

| | | | | |
|---|---|---|---|---|
| 8,878,451 B2 | 11/2014 | Lee et al. | | |
| 2003/0144020 A1* | 7/2003 | Challa | ............... | H04W 56/0035 |
| | | | | 455/69 |
| 2007/0143499 A1* | 6/2007 | Chang | .................... | G06Q 10/10 |
| | | | | 700/100 |
| 2007/0242634 A1* | 10/2007 | Calcev | .............. | H04W 52/0225 |
| | | | | 370/318 |
| 2008/0291855 A1* | 11/2008 | Bata | ...................... | H04W 84/18 |
| | | | | 370/311 |

(Continued)

FOREIGN PATENT DOCUMENTS

EP            2136591 A2    12/2009

OTHER PUBLICATIONS

International Search Report and Written Opinion—PCT/US2024/039278—ISA/EPO—Nov. 20, 2024.

*Primary Examiner* — Stephen J Clawson
(74) *Attorney, Agent, or Firm* — Harrity & Harrity, LLP

(57) ABSTRACT

Various aspects of the present disclosure generally relate to wireless communication. In some aspects, a wireless communication device (WCD) may perform a clock tracking procedure that comprises: transmitting, to an access point (AP), an extended personal area network (XPAN) synchronization message pair that is addressed to a peripheral device associated with the WCD, and receiving, from the AP, an XPAN synchronization response message pair that is associated with the XPAN synchronization message pair. The WCD may transmit, to the AP, user data that is addressed to the peripheral device at a time that is based at least in part on an estimated awake window, the estimated awake window being based at least in part on the XPAN synchronization response message pair. Numerous other aspects are described.

26 Claims, 11 Drawing Sheets

(56) References Cited

U.S. PATENT DOCUMENTS

| | | | |
|---|---|---|---|
| 2009/0196209 A1* | 8/2009 | Haartsen ........... | H04W 52/0216 |
| | | | 370/311 |
| 2012/0188997 A1* | 7/2012 | Zakrzewski ............ | H04W 4/70 |
| | | | 370/350 |
| 2012/0263165 A1* | 10/2012 | Zakrzewski ........ | H04W 56/009 |
| | | | 370/350 |
| 2016/0037306 A1* | 2/2016 | Johnson .................. | H04W 4/33 |
| | | | 340/5.7 |
| 2017/0048671 A1* | 2/2017 | Marri Sridhar ... | H04W 56/0015 |
| 2017/0098466 A1* | 4/2017 | Elliot ..................... | H04R 27/00 |
| 2018/0020405 A1* | 1/2018 | Huang ............. | H04W 52/0229 |
| 2019/0045304 A1* | 2/2019 | Bhalla ...................... | H04R 3/12 |
| 2020/0229086 A1* | 7/2020 | Monajemi ............ | H04W 72/20 |
| 2024/0143272 A1* | 5/2024 | Barros ................... | G06F 3/165 |

* cited by examiner

Figure 8:
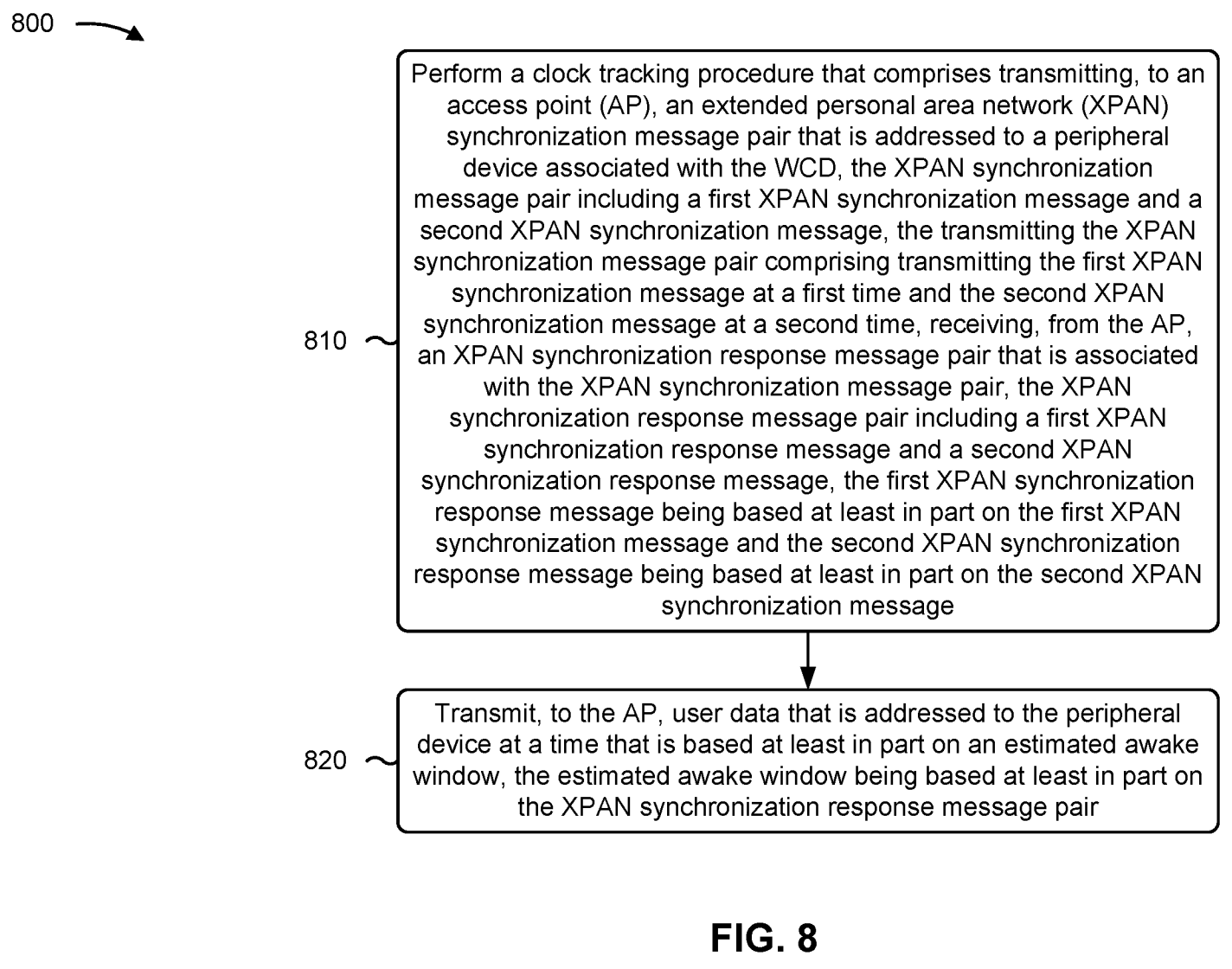

810

Perform a clock tracking procedure that comprises transmitting, to an access point (AP), an extended personal area network (XPAN) synchronization message pair that is addressed to a peripheral device associated with the WCD, the XPAN synchronization message pair including a first XPAN synchronization message and a second XPAN synchronization message, the transmitting the XPAN synchronization message pair comprising transmitting the first XPAN synchronization message at a first time and the second XPAN synchronization message at a second time, receiving, from the AP, an XPAN synchronization response message pair that is associated with the XPAN synchronization message pair, the XPAN synchronization response message pair including a first XPAN synchronization response message and a second XPAN synchronization response message, the first XPAN synchronization response message being based at least in part on the first XPAN synchronization message and the second XPAN synchronization response message being based at least in part on the second XPAN synchronization message

820

Transmit, to the AP, user data that is addressed to the peripheral device at a time that is based at least in part on an estimated awake window, the estimated awake window being based at least in part on the XPAN synchronization response message pair

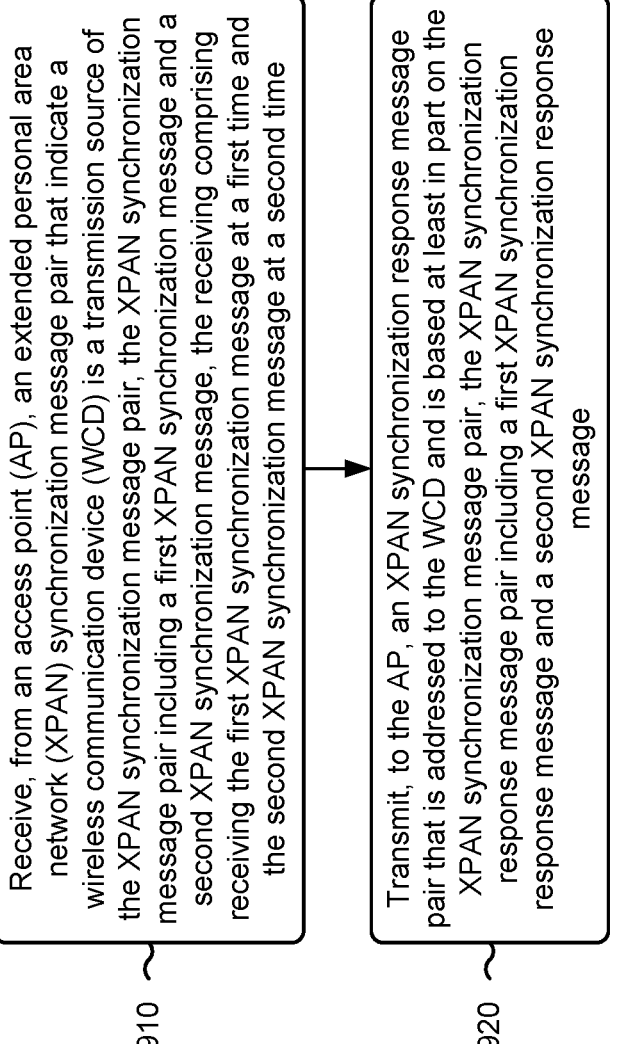

910   Receive, from an access point (AP), an extended personal area network (XPAN) synchronization message pair that indicate a wireless communication device (WCD) is a transmission source of the XPAN synchronization message pair, the XPAN synchronization message pair including a first XPAN synchronization message and a second XPAN synchronization message, the receiving comprising receiving the first XPAN synchronization message at a first time and the second XPAN synchronization message at a second time 920   Transmit, to the AP, an XPAN synchronization response message pair that is addressed to the WCD and is based at least in part on the XPAN synchronization message pair, the XPAN synchronization response message pair including a first XPAN synchronization response message and a second XPAN synchronization response message

EXTENDED PERSONAL AREA NETWORK TIME SYNCHRONIZATION BETWEEN A WIRELESS COMMUNICATION DEVICE AND A PERIPHERAL DEVICE

FIELD OF THE DISCLOSURE

Aspects of the present disclosure generally relate to wireless communication and to techniques and apparatuses for synchronization between a wireless communication device and a peripheral device.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network, may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. "Downlink" may refer to the communication link from the AP to the station, and "uplink" may refer to the communication link from the station to the AP.

The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (WPAN), which may include a Bluetooth connection, may provide for short range wireless connections between two or more paired wireless devices. For example, wireless devices such as cellular phones may utilize WPAN communications to exchange information such as audio signals with wireless headsets.

SUMMARY

Some aspects described herein relate to a method of wireless communication performed by a wireless communication device (WCD). The method may include performing a clock tracking procedure that comprises transmitting, to an access point (AP), an extended personal area network (XPAN) synchronization message pair that is addressed to a peripheral device associated with the WCD, the XPAN synchronization message pair including a first XPAN synchronization message and a second XPAN synchronization message, the transmitting the XPAN synchronization message pair comprising transmitting the first XPAN synchronization message at a first time and the second XPAN synchronization message at a second time, receiving, from the AP, an XPAN synchronization response message pair that is associated with the XPAN synchronization message pair, the XPAN synchronization response message pair including a first XPAN synchronization response message and a second XPAN synchronization response message, the first XPAN synchronization response message being based at least in part on the first XPAN synchronization message and the second XPAN synchronization response message being based at least in part on the second XPAN synchronization message. The method may include transmitting, to the AP, user data that is addressed to the peripheral device at a time that is based at least in part on an estimated awake window, the estimated awake window being based at least in part on the XPAN synchronization response message pair.

Some aspects described herein relate to a method of wireless communication performed by peripheral device. The method may include receiving, from an AP, an XPAN synchronization message pair that indicates a WCD is a transmission source of the XPAN synchronization message pair, the XPAN synchronization message pair including a first XPAN synchronization message and a second XPAN synchronization message, the receiving comprising receiving the first XPAN synchronization message at a first time and the second XPAN synchronization message at a second time. The method may include transmitting, to the AP, an XPAN synchronization response message pair that is addressed to the WCD and is based at least in part on the XPAN synchronization message pair, the XPAN synchronization response message pair including a first XPAN synchronization response message and a second XPAN synchronization response message.

Some aspects described herein relate to an apparatus for wireless communication at a WCD. The apparatus may include one or more memories and one or more processors coupled to the one or more memories. The one or more processors may be configured, individually or collectively, to perform a clock tracking procedure that causes the WCD to transmit, to an AP, an XPAN synchronization message pair that is addressed to a peripheral device associated with the WCD, the XPAN synchronization message pair including a first XPAN synchronization message and a second XPAN synchronization message. The one or more processors may be configured to cause the WCD to transmit the first XPAN synchronization message at a first time and the second XPAN synchronization message at a second time. The clock tracking procedure may cause the WCD to receive, from the AP, an XPAN synchronization response message pair that is associated with the XPAN synchronization message pair, and the XPAN synchronization response message pair may include a first XPAN synchronization response message and a second XPAN synchronization response message. The first XPAN synchronization response message may be based at least in part on the first XPAN synchronization message and the second XPAN synchronization response message may be based at least in part on the second XPAN synchronization message. The one or more processors may be configured to cause the WCD to transmit, to the AP, user data that is addressed to the peripheral device at a time that is based at least in part on an estimated awake window, the estimated awake window being based at least in part on the XPAN synchronization response message pair.

Some aspects described herein relate to an apparatus for wireless communication at a peripheral device. The apparatus may include one or more memories and one or more processors coupled to the one or more memories. The one or more processors may be configured, individually or collectively, cause the peripheral device to receive, from an AP, an XPAN synchronization message pair that indicates a WCD is a transmission source of the XPAN synchronization message pair, the XPAN synchronization message pair including a first XPAN synchronization message and a second XPAN synchronization message, the one or more instructions configured to cause the peripheral device to receive the first XPAN synchronization message at a first time and the second XPAN synchronization message at a second time. The one or more processors may be configured to transmit, to the AP, an XPAN synchronization response message pair that is addressed to the WCD and is based at least in part on the XPAN synchronization message pair, the XPAN synchronization response message pair including a first XPAN synchronization response message and a second XPAN synchronization response message.

Some aspects described herein relate to a non-transitory computer-readable medium that stores a set of instructions for wireless communication by a WCD. The set of instructions, when executed by one or more processors of the WCD, may cause the WCD to perform a clock tracking procedure that causes the WCD to transmit, to an AP, an XPAN synchronization message pair that is addressed to a peripheral device associated with the WCD. The XPAN synchronization message pair may include a first XPAN synchronization message and a second XPAN synchronization message, and the one or more instructions may be configured to cause the WCD to transmit the first XPAN synchronization message at a first time and the second XPAN synchronization message at a second time. The clock tracking procedure may cause the WCD to receive, from the AP, an XPAN synchronization response message pair that is associated with the XPAN synchronization message pair, the XPAN synchronization response message pair including a first XPAN synchronization response message and a second XPAN synchronization response message, the first XPAN synchronization response message being based at least in part on the first XPAN synchronization message and the second XPAN synchronization response message being based at least in part on the second XPAN synchronization message. The set of instructions, when executed by one or more processors of the WCD, may cause the WCD to transmit, to the AP, user data that is addressed to the peripheral device at a time that is based at least in part on an estimated awake window, the estimated awake window being based at least in part on the XPAN synchronization response message pair.

Some aspects described herein relate to a non-transitory computer-readable medium that stores a set of instructions for wireless communication by a peripheral device. The set of instructions, when executed by one or more processors of the peripheral device, may cause the peripheral device to receive, from an AP, an XPAN synchronization message pair that indicates a WCD is a transmission source of the XPAN synchronization message pair, the XPAN synchronization message pair including a first XPAN synchronization message and a second XPAN synchronization message, the one or more instructions configured to cause the peripheral device to receive the first XPAN synchronization message at a first time and the second XPAN synchronization message at a second time. The set of instructions, when executed by one or more processors of the peripheral device, may cause the peripheral device to transmit, to the AP, an XPAN synchronization response message pair that is addressed to the WCD and is based at least in part on the XPAN synchronization message pair, the XPAN synchronization response message pair including a first XPAN synchronization response message and a second XPAN synchronization response message.

Some aspects described herein relate to an apparatus for wireless communication. The apparatus may include means for performing a clock tracking procedure that comprises means for transmitting, to an AP, an XPAN synchronization message pair that is addressed to a peripheral device associated with the WCD, the XPAN synchronization message pair including a first XPAN synchronization message and a second XPAN synchronization message, the transmitting the XPAN synchronization message pair comprising transmitting the first XPAN synchronization message at a first time and the second XPAN synchronization message at a second time, means for receiving, from the AP, an XPAN synchronization response message pair that is associated with the XPAN synchronization message pair, the XPAN synchronization response message pair including a first XPAN synchronization response message and a second XPAN synchronization response message, the first XPAN synchronization response message being based at least in part on the first XPAN synchronization message and the second XPAN synchronization response message being based at least in part on the second XPAN synchronization message. The apparatus may include means for transmitting, to the AP, user data that is addressed to the peripheral device at a time that is based at least in part on an estimated awake window, the estimated awake window being based at least in part on the XPAN synchronization response message pair.

Some aspects described herein relate to an apparatus for wireless communication. The apparatus may include means for receiving, from an AP, an XPAN synchronization message pair that indicates a WCD is a transmission source of the XPAN synchronization message pair, the XPAN synchronization message pair including a first XPAN synchronization message and a second XPAN synchronization message, the receiving comprising receiving the first XPAN synchronization message at a first time and the second XPAN synchronization message at a second time. The apparatus may include means for transmitting, to the AP, an XPAN synchronization response message pair that is addressed to the WCD and is based at least in part on the XPAN synchronization message pair, the XPAN synchronization response message pair including a first XPAN synchronization response message and a second XPAN synchronization response message.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a WCD, in accordance with the present disclosure.

FIG. 9 is a diagram illustrating an example process performed, for example, by a peripheral device, in accordance with the present disclosure.

DETAILED DESCRIPTION

Figure 1:
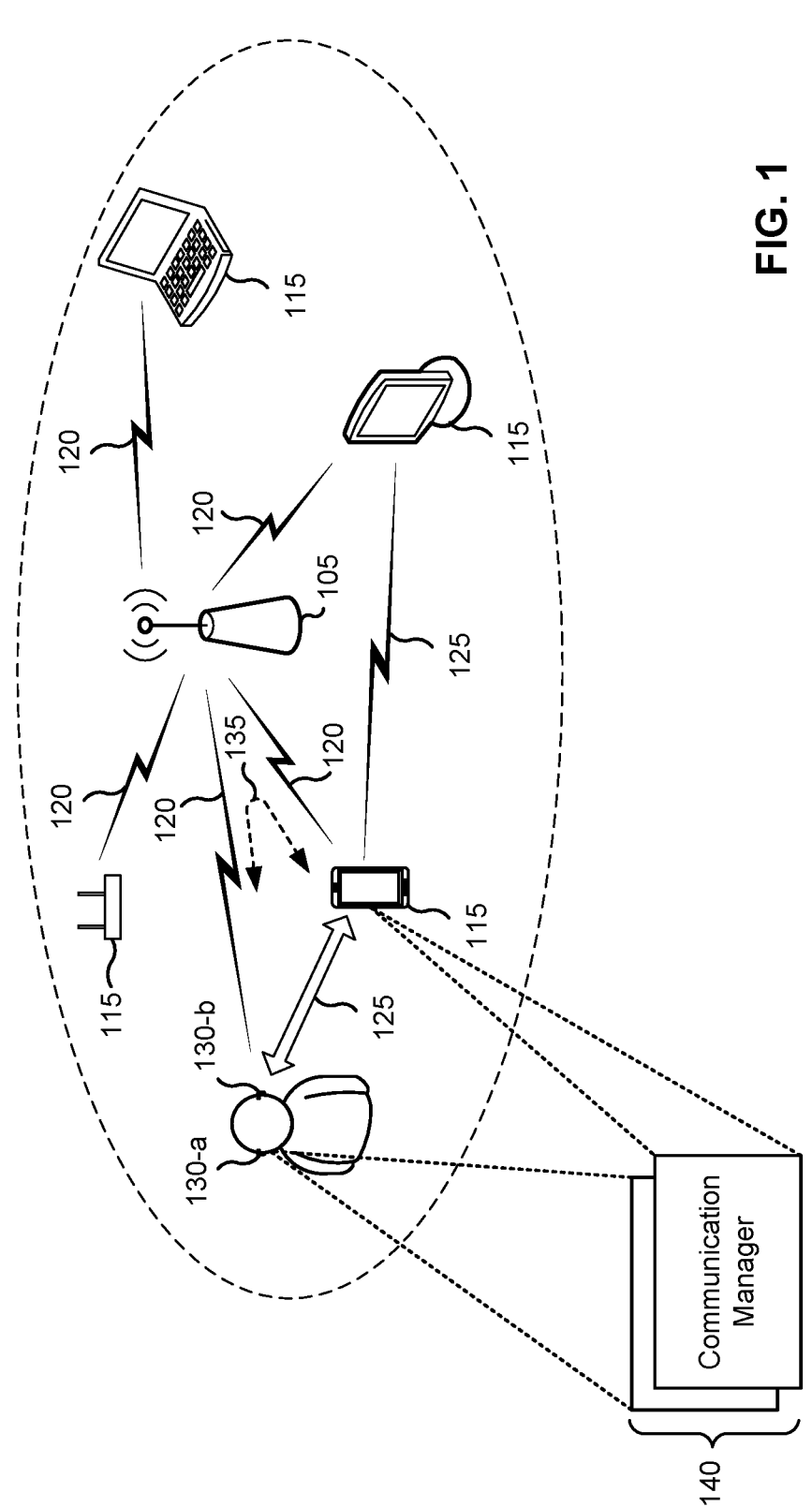
FIG. 1 illustrates a wireless communication system that is configured in accordance with the present disclosure.

A wireless communication device (WCD) may communicate with a peripheral device (e.g., an earbud) based at least in part on a variety of mechanisms, such as through an extended personal area network (XPAN), through an access point (AP), and/or through a local wireless link. In some aspects, the WCD and/or the peripheral device may operate in a respective power saving mode that is associated with the device transitioning between an active state and a sleep state. The transitions between the active state and the sleep state may introduce synchronization errors between the WCD and the peripheral device and/or may increase power consumption by the peripheral device. As one example, the WCD may calculate erroneous timing information that is based at least in part on performing a calculation that assumes symmetrical propagation delays for a send path and a receive path, as described below. In some aspects, the erroneous timing information may result in the WCD transmitting user data to the peripheral device at a point in time that causes the peripheral device to extend a duration of an awake window to recover the user data. Extending a duration of an awake window and/or an active state may result in additional power consumption by the peripheral device and/or a shorter battery life of a battery at the peripheral device. Alternatively, or additionally, the timing errors may result in errors at the peripheral device, such as playback errors associated with audio output by the peripheral device.

Various aspects described herein generally relate to synchronization between a wireless communication device and a peripheral device. Some aspects relate more specifically to a WCD performing a clock tracking procedure that may be used to derive timing information (e.g., synchronization timing information and/or awake window timing information). In some aspects, a WCD may perform a clock tracking procedure that uses at least an XPAN synchronization message pair and an XPAN synchronization response message pair. The WCD may transmit, to an AP, an XPAN synchronization message pair that is addressed to a peripheral device that is associated with the WCD. In some aspects, the XPAN synchronization message pair includes at least a first XPAN synchronization message and a second XPAN synchronization message, and the WCD may transmit the first XPAN synchronization message at a first time and the second XPAN synchronization message at a second time. For simplicity, "message pair" as used herein denotes two or more messages. That is, the XPAN synchronization message pair may include two or more XPAN synchronization messages, and the WCD may transmit each XPAN synchronization message of the XPAN synchronization message pair at a respective time.

The WCD may receive, from the AP, an XPAN synchronization response message pair that is associated with the XPAN synchronization message pair. In some aspects, the XPAN synchronization response message pair includes at least a first XPAN synchronization response message and a second XPAN synchronization response message, but may include more than two XPAN synchronization response messages. The first XPAN synchronization response message may be based at least in part on the first XPAN synchronization message, and the second XPAN synchronization response message may be based at least in part on the second XPAN synchronization message. Alternatively, or additionally, the XPAN synchronization response message pair may indicate that the peripheral device is a transmission source of the XPAN synchronization response message pair. Based at least in part on receiving the XPAN synchronization response message pair, the WCD may transmit, to the AP, user data that is addressed to the peripheral device at a time that is based at least in part on an estimated awake window of the peripheral device. In some aspects, the WCD may calculate the estimated awake window being based at least in part on the XPAN synchronization response message pair as described below.

The use of an XPAN synchronization message pair in combination with an XPAN synchronization message response pair may enable a WCD to calculate timing information associated with an awake window of a peripheral device as described below, and reduce power consumption by the peripheral device, such as by mitigating the peripheral device extending a duration of an awake window and/or active state. To illustrate, the WCD may calculate a first time that is structured to reduce a transmission delay in a transmission path from the WCD to the peripheral device. In some aspects, the WCD may transmit an XPAN synchronization message and/or an XPAN synchronization time message to the AP based at least in part on the first time such that the AP may forward, relay, and/or transmit the XPAN synchronization to the peripheral device at a second time that mitigates the peripheral device extending a duration of the awake window and/or enables the peripheral device to use a minimum duration for the wake up window. Mitigating the peripheral device extending a duration of an awake window may reduce power consumption by the peripheral device, and/or extend a battery life of a battery at the peripheral device. Alternatively, or additionally, the use of the XPAN synchronization message pair in combination with the XPAN synchronization message response pair may enable a WCD to calculate timing information associated with synchronizing a first clock at the WCD with a second clock at a peripheral device. Synchronizing clocks between a WCD and a peripheral device may mitigate output errors at the peripheral device.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

In some networks, a WCD may support applications associated with low-latency or lossless audio to one or more other devices, such as one or more personal audio devices. For example, a wireless communication device may support applications and use cases associated with ultra-low-latency (ULL), such as ULL gaming, or streaming lossless audio to one or more personal audio devices (e.g., peripheral devices) of a user. In scenarios in which a user uses two peripheral devices, the wireless communication device may support an XPAN via which the wireless communication device may communicate with the two peripheral devices. To meet latency or lossless criteria associated with an application or use case. XPAN devices may employ a target wake time (TWT) technique for communication between the wireless communication device and the peripheral devices. Alternatively, or additionally, the WCD and the peripheral devices may communicate with one another via an AP as described below. To illustrate, the WCD and the peripheral devices may exchange user data via the AP, such as high-fidelity audio user data, high-fidelity voice user data, real-time content, motion tracking content (e.g., head tracking content, hand tracking content, and/or body tracking content), gaming content, extended reality (XR) content (e.g., video and/or audio), spatial audio rendering content, and/or voice call processing content.

In some implementations, a WCD, which may be a handset or an AP (e.g., a soft AP (SAP)), and a set of peripheral devices (e.g., earbuds or audio devices) may use downlink audio data packets to carry updated TWT parameters or any other XPAN-related parameters that the wireless communication device and the peripheral devices may indicate via wireless signaling. Additionally, or alternatively, the wireless communication device may embed a set of updated parameters in a padding section of an audio data packet and may transmit the audio data packet to the peripheral devices. The peripheral devices may each acknowledge the audio data packet transmitted by the wireless communication device, and the wireless communication device may communicate in accordance with the updated parameters based on receiving acknowledgements from each of the peripheral devices.

FIG. 1 illustrates a wireless communication system 100 (also known as a wireless local area network (WLAN) or a Wi-Fi network) configured in accordance with the present disclosure. The wireless communication system 100 may include an AP 105 and multiple associated devices 115 (such as stations (STAs) or SAPs), which may represent devices such as mobile stations, personal digital assistants (PDAs), other handheld devices, netbooks, notebook computers, tablet computers, laptops, display devices (e.g., TVs, computer monitors, etc.), printers, etc. The AP 105 and the associated devices 115 (e.g., associated STAs) may represent a basic service set (BSS) or an extended service set (ESS). A BSS includes devices that communicate with each other, and an ESS may include multiple BSSs or one or more BSSs and associated wired networks. The various devices 115 in the network are able to communicate with one another through the AP 105. Also shown is a coverage area 110 of the AP 105, which may represent a basic service area (BSA) of the wireless communication system 100. An extended network station (not shown) associated with the wireless communication system 100 may be connected to a wired or wireless distribution system that may allow multiple APs 105 to be connected in an ESS.

Although not shown in FIG. 1, a device 115 may be located in the intersection of more than one coverage area 110 and may associate with more than one AP 105. A single AP 105 and an associated set of devices 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The wireless communication system 100 may include APs 105 of different types (e.g., metropolitan area, home network, etc.), with varying and overlapping coverage areas 110. Two devices 115 may also communicate directly via a direct wireless communication link 125 regardless of whether both devices 115 are in the same coverage area 110. Examples of direct wireless communication links 120 may include Wi-Fi Direct connections, Wi-Fi Tunneled Direct Link Setup (TDLS) links, and other group connections.

In some cases, a device 115 (or an AP 105) may be detectable by a central AP 105, but not by other devices 115 in the coverage area 110 of the central AP 105. For example, one device 115 may be at one end of the coverage area 110 of the central AP 105 while another device 115 may be at the other end. Thus, both devices 115 may communicate with the AP 105, but may not receive the transmissions of the other. This may result in colliding transmissions for the two devices 115 in a contention-based environment (e.g., carrier sense multiple access with collision avoidance (CSMA/CA)) because the devices 115 may not refrain from transmitting on top of each other. A device 115 whose transmissions are not identifiable, but that is within the same coverage area 110 may be known as a hidden node. CSMA/CA may be supplemented by the exchange of a request-to-send (RTS) packet transmitted by a sending device 115 (or AP 105) and a clear-to-send (CTS) packet transmitted by the receiving device 115 (or AP 105). This may alert other devices within range of the sender and receiver not to transmit for the duration of the primary transmission. Thus, RTS and/or CTS may help mitigate a hidden node problem.

The wireless communication system 100 may include an AP 105, devices 115 (e.g., which may be referred to as source devices or central devices), and paired devices 115 (e.g., which may be referred to as sink devices or peripheral devices) implementing WLAN communications (e.g., Wi-Fi communications) and/or Bluetooth communications. For example, devices 115 may include cell phones, user equipments (UEs), STAs, mobile stations, PDAs, other handheld devices, netbooks, notebook computers, tablet computers, laptops, or some other suitable terminology. Paired devices 115 may include Bluetooth-enabled devices capable of pairing with other Bluetooth-enabled devices (e.g., such as devices 115), which may include wireless audio devices (e.g., headsets, earbuds, speakers, earpieces, headphones), display devices (e.g., TVs, computer monitors), microphones, meters, valves, etc. As one example, the paired devices 115 may include a wireless earbud 130-_a_ and a wireless earbud 130-_b_ as shown by FIG. 1, and the paired devices 115 may alternatively or additionally communicate with the AP 105. In some aspects, a paired device 115 may communicate with a device 115 using the AP 105.

"Bluetooth communications" may refer to a short-range communication protocol and may be used to connect and exchange information between devices 115 and paired devices 115 (e.g., between mobile phones, computers, digital cameras, wireless headsets, speakers, keyboards, mice or other input peripherals, and similar devices). Bluetooth systems (e.g., aspects of wireless communication system 100) may be organized using a central-peripheral relationship employing a time-division duplex protocol having, for example, defined time slots of 625 microseconds, in which transmission alternates between the central device (e.g., a device 115) and one or more peripheral devices (e.g., paired devices 115). In some examples, "device 115" may generally refer to a central device, and "paired device 115" may refer to a peripheral device in the wireless communication system 100. Therefore, in some examples, a device may be referred to as either a device 115 or a paired device 115 based on the Bluetooth role configuration of the device. That is, designation of a device as either a device 115 or a paired device 115 may not necessarily indicate a distinction in device capability, but rather may refer to or indicate roles held by the device in the wireless communication system 100. Generally, "device 115" may refer to a wireless communication device capable of wirelessly exchanging data signals with another device (e.g., a paired device 115), and "paired device 115" may refer to a device operating in a peripheral role, or to a short-range wireless communication device capable of exchanging data signals with the device 115 (e.g., using Bluetooth communication protocols).

A communication link 125 may be established between two Bluetooth-enabled devices (e.g., between a device 115 and a paired device 115) and may provide for communications or services (e.g., according to some Bluetooth profiles). The controller stack may be responsible for setting up communication links 125, such as asynchronous connection-oriented links (or asynchronous connection-oriented connections), synchronous connection-orientated (SCO) links (or SCO connections), extended synchronous connection-oriented (eSCO) links (or eSCO connections), other logical transport channel links, etc. For example, a Bluetooth connection may be an eSCO connection for voice calls (e.g., which may allow for retransmission), an asynchronous connection-less (ACL) connection for music streaming (e.g., advanced audio distribution profile (A2DP)), etc. eSCO packets may be transmitted in predetermined time slots (e.g., 6 Bluetooth slots each for eSCO). The regular interval between the eSCO packets may be specified when the Bluetooth link is established. The eSCO packets to/from a specific device (e.g., paired device 115) are acknowledged and may be retransmitted if not acknowledged during a retransmission window. In addition, audio may be streamed between a device 115 and a paired device 115 using an ACL connection (e.g., an A2DP profile). In some cases, the ACL connection may occupy 1, 3, or 5 Bluetooth slots for data or voice. Other Bluetooth profiles supported by Bluetooth-enabled devices may include Bluetooth Low Energy (BLE) (e.g., providing considerably reduced power consumption and cost while maintaining a similar communication range), human interface device (HID) profile (e.g., providing low latency links with low power requirements), etc.

A device may, in some examples, be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some examples, Bluetooth and WLAN communications may share a same medium, such as the same unlicensed frequency medium. In such examples, a device 115 may support WLAN communications via AP 105 (e.g., over communication links 120). The AP 105 and the associated devices 115 may represent a BSS or an ESS. The various devices 115 in the network may be able to communicate with one another through the AP 105. In some cases, the AP 105 may be associated with a coverage area, which may represent a BSA.

Devices 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100, and devices may communicate with each other via communication links 120 (e.g., Wi-Fi Direct connections, Wi-Fi TDLS links, peer-to-peer communication links, or other peer or group connections). AP 105 may be coupled to a network (such as the Internet) and may enable a device 115 to communicate via the network (or communicate with other devices 115 coupled to the AP 105). A device 115 may communicate with a network device bi-directionally. For example, in a WLAN, a device 115 may communicate with an associated AP 105 via downlink (e.g., the communication link from the AP 105 to the device 115) and uplink (e.g., the communication link from the device 115 to the AP 105).

In some examples, content, media, audio, etc. exchanged between a device 115 and a paired device 115 may originate from a WLAN. For example, in some examples, device 115 may receive audio from an AP 105 (e.g., via WLAN communications), and the device 115 may then relay or pass the audio to the paired device 115 (e.g., via Bluetooth communications and/or the AP 105). As one example, the device 115 may relay or pass the audio to the paired device 115 via the direct wireless communication link 125. Alternatively, or additionally, the device 115 may relay and/or pass the audio to the paired device via the AP 105 as shown by reference number 135. In some examples, certain types of Bluetooth communications (e.g., such as high quality or high definition (HD) Bluetooth) may require enhanced quality of service. For example, in some examples, delay-sensitive Bluetooth traffic may have a higher priority than WLAN traffic.

In some deployments, a wireless communication device may support applications associated with low-latency or lossless audio to one or more other devices, such as one or more personal audio devices. For example, a wireless communication device may support applications and use cases associated with ULL, such as ULL gaming, or streaming lossless audio to one or more personal audio devices (e.g., peripheral devices) of a user. In scenarios in which a user uses two peripheral devices (e.g., a wireless earbud 130-a and a wireless earbud 130-b), the wireless communication device may support an XPAN via which the wireless communication device may communicate with the two peripheral devices.

In some aspects, a device (e.g., a device 115, a peripheral device, a wireless earbud 130-a, and/or a wireless earbud 130-b) may include a communication manager 140. As described in more detail elsewhere herein, the communication manager 140 may perform a clock tracking procedure that causes the device to transmit, to an AP, an XPAN synchronization message pair that is addressed to a peripheral device associated with the device. The XPAN synchronization message pair may include a first XPAN synchronization message and a second XPAN synchronization message. The clock tracking procedure may cause the device to transmit the first XPAN synchronization message at a first time and the second XPAN synchronization message at a second time. The clock tracking procedure may cause the device to receive, from the AP, an XPAN synchronization response message pair that is associated with the XPAN synchronization message pair, and the XPAN synchronization response message pair may include a first XPAN synchronization response message and a second XPAN synchronization response message. The first XPAN synchronization response message may be based at least in part on the first XPAN synchronization message and the second XPAN synchronization response message may be based at least in part on the second XPAN synchronization message. The communication manager 140 may transmit, to the AP, user data that is addressed to the peripheral device at a time that is based at least in part on an estimated awake window, the estimated awake window being based at least in part on the XPAN synchronization response message pair. Additionally, or alternatively, the communication manager 140 may perform one or more other operations described herein.

In some aspects, the communication manager 140 may receive, from an AP, an XPAN synchronization message pair that indicates that a WCD is a transmission source of the XPAN synchronization message pair, and the XPAN synchronization message pair may include a first XPAN synchronization message and a second XPAN synchronization message. The communication manager 140 may receive the first XPAN synchronization message at a first time and the second XPAN synchronization message at a second time. The communication manager 140 may transmit, to the AP, an XPAN synchronization response message pair that is addressed to the WCD and is based at least in part on the XPAN synchronization message pair. The XPAN synchronization response message pair may include a first XPAN synchronization response message and a second XPAN synchronization response message. Additionally, or alternatively, the communication manager 140 may perform one or more other operations described herein.

As indicated above, FIG. 1 is provided as an example. Other examples may differ from what is described with regard to FIG. 1.

Figure 2:
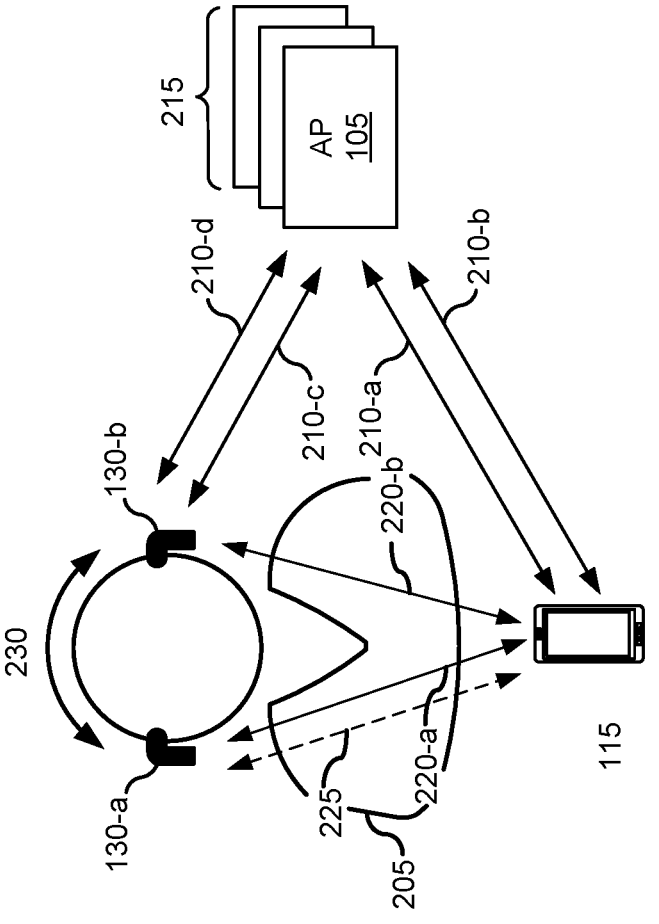
FIG. 2 illustrates an example of a wireless communication system in accordance with the present disclosure.

FIG. 2 illustrates an example of a wireless communication system 200 in accordance with the present disclosure. The wireless communication system 200 may implement or be implemented to realize aspects of the wireless communication system 100. For example, the wireless communication system 200 illustrates communication between an AP 105, a device 115 (e.g., a handset or handheld device), and a wireless earbud 130-a and a wireless earbud 130-b of a user 205 (e.g., examples of audio devices and/or peripheral devices), which may be examples of corresponding devices as illustrated by and described with reference to FIG. 1. In some implementations, the device 115, the wireless earbud 130-a, and the wireless earbud 130-b may support a signaling-based mechanism according to which the device 115 may transmit an indication of a set of updated parameters to each of the wireless earbud 130-a and the wireless earbud 130-b via one or audio data packets.

In some deployments, the device 115 may communicate with the AP 105 via one or both of a link 210-a and a link 210-b, which may be examples of infrastructure links between the AP 105 and the device 115. Alternatively, or additionally, the AP 105 may communicate with the wireless earbud 130-a and/or the wireless earbud 130-b via one or both of a link 210-c and a link 210-d, respectively. In some aspects, the wireless earbud 130-a and the wireless earbud 130-b may be connected to a same AP 105 as the device 115, while in other aspects, the wireless earbud 130-a and the wireless earbud 130-b may be connected to a different AP 105 as the device 115. Accordingly, and as shown by reference number 215, the device 115, the wireless earbud 130-a, and/or the wireless earbud 130-b may communicate with one another via multiple APs 105. The link 210-a may be an example of a 2.4 GHz link between the AP 105 and the device 115, and the link 210-b may be an example of a 5 GHz link or a 6 GHz link between the AP 105 and the device 115. In some aspects, the link 210-c and/or the link 210-d may be a 2.4 GHz link, a 5 GHz, and/or a 6 GHz link.

The device 115 may communicate wirelessly with each of the wireless earbud 130-a and the wireless earbud 130-b, where each of the wireless earbud 130-a and the wireless earbud 130-b may be associated with an XPAN of the device 115. For example, the device 115 may communicate with the wireless earbud 130-a via a link 220-a and may communicate with the wireless earbud 130-b via a link 220-b, where the link 220-a and the link 220-b may be referred to or understood as XPAN links. The link 220-a may be an example of a 5 GHz link or a 6 GHz link and the link 220-b may be an example of a 5 GHz link or a 6 GHz link. Additionally, in some examples, the device 115 may communicate with the wireless earbud 130-a, which may be an example of a primary earbud, via a communication link 225. The communication link 225 may be an example of a Bluetooth link between the device 115 and the wireless earbud 130-a. The wireless earbud 130-a and the wireless earbud 130-b, which may be an example of a secondary earbud, may communicate with each other via a link 230, which may be an example of a Bluetooth link between the wireless earbud 130-a and the wireless earbud 130-b.

The device 115 may communicate with the wireless earbud 130-a and/or the wireless earbud 130-b via one or more APs 105. To illustrate, the device 115 may communicate with a first AP 105 via the link 210-a and/or the link 210-b. The first AP 105 may be connected to a second AP 105, and the second AP 105 may be connected to the wireless earbud 130-a and/or the wireless earbud 130-b via the link 210-c and/or the link 210-d. Accordingly, the device 115 may communicate with the wireless earbud 130-a and/or the wireless earbud 130-b based at least in part on communicating with the first AP 105, the first AP 105 communicating with the second AP 105, and the second AP 105 communicating with the wireless earbud 130-a and/or the wireless earbud 130-b. However, in other aspects, the device 115, the wireless earbud 130-a, and/or the wireless earbud 130-b may be connected to a same AP 105.

In some cases, the device 115, the wireless earbud 130-a, and the wireless earbud 130-b may support or belong to an XPAN and may use the XPAN to support one or more applications or use cases, such as applications or use cases associated with latency or lossless audio constraints or criteria. For example, the device 115 may support one or more use cases of ULL gaming and streaming lossless audio to the wireless earbud 130-a and the wireless earbud 130-b (e.g., personal devices of the device 115). For such applications, the device 115 may be expected to keep end-to-end latency below a relatively stringent latency target (e.g., 40 milliseconds (msec) for ULL gaming). Further, the device 115 may also be tasked with handling (e.g., gracefully handling without a hard disconnect and/or loss of data) a coexistence of XPAN traffic (e.g., traffic to or from one or both of the wireless earbud 130-a and the wireless earbud 130-b) with other concurrency scenarios the user 205 or the system may initiate. Such other concurrency scenarios may include a scan concurrency for channel selection, STA infrastructure link concurrency for online gaming or other traffic to or from the AP 105, or neighbor aware networking (NAN) discovery and NAN data transfer, or any combination thereof.

The device 115 may have an operating condition and/or an operating specification to meet, such as a data transfer latency operating condition for various applications or use cases (e.g., an ultra-low-latency constraint for a ULL gaming use case) and also facilitate coexistence between XPAN and other concurrency scenarios on the device 115. To meet the latency operating condition associated with, for example, ULL gaming, a power constraint of the wireless earbud 130-a and the wireless earbud 130-b, and/or power and concurrency constraints at the device 115, the device 115 may employ a TWT technique for the communication between the device 115 (which may act or function as an SAP) and each of the wireless earbud 130-a and wireless earbud 130-b (which may act or function as STAs). Alternatively, or additionally, the device 115 may employ one or more power saving mode time synchronization techniques as described below.

In some implementations, the device 115, the wireless earbud 130-a, and the wireless earbud 130-b may support a data-packet-generation-based and signaling-based mechanism according to which the device 115 may embed an indication of one or more updated parameters in one or more audio data packets that the device 115 may transmit to the wireless earbud 130-a and the wireless earbud 130-b. For example, if the device 115 detects a change that triggers a parameter update, or if the device 115 otherwise determines to transmit a set of parameters to the wireless earbud 130-a and the wireless earbud 130-b with low latency, the device 115 may embed the parameters in one or more downlink audio data packets and may transmit the one or more downlink audio data packets to the wireless earbud 130-a and the wireless earbud 130-b. In some implementations, the device 115 may transmit an indication of the parameters to the wireless earbud 130-a via a first audio data packet transmitted using a first Wi-Fi link (e.g., a first XPAN Wi-Fi link) and may transmit an indication of the parameters to the wireless earbud 130-b via a second audio data packet transmitted using a second Wi-Fi link (e.g., a second XPAN Wi-Fi link). The first audio data packet and the second audio data packet may include the same information or may include different information, and each may be examples of physical layer convergence protocol (PLCP) protocol data units (PPDUs).

As indicated above, FIG. 2 is provided as an example. Other examples may differ from what is described with regard to FIG. 2.

Figures 3A, 3B:
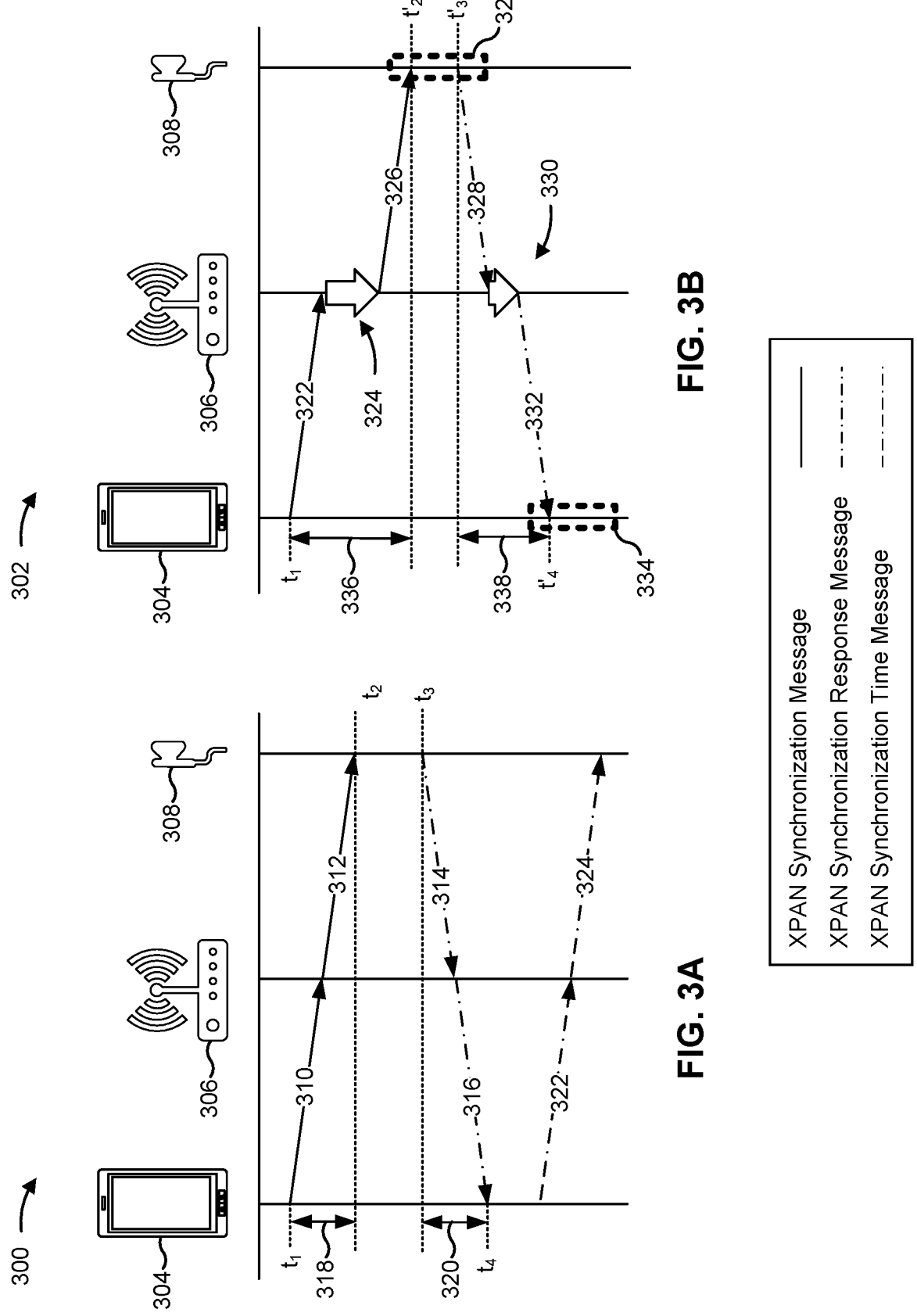
FIGS. 3A and 3B are diagrams illustrating a first example and a second example of interactions between a wireless communication device (WCD), an access point (AP), and a peripheral device, in accordance with the present disclosure.

FIGS. 3A and 3B are diagrams illustrating a first example 300 and a second example 302 of interactions between a WCD 304 (e.g., a device 115), an AP 306 (e.g., an AP 105), and a peripheral device 308 (e.g., another device 115, a wireless earbud 130-a, and/or a wireless earbud 130-b), in accordance with the present disclosure. For visual clarity, FIGS. 3A and 3B illustrate a single AP 306 in communication with the WCD 304 and the peripheral device 308, but other examples may include multiple APs that, collectively, relay communications between the WCD 304 and the peripheral device 308. For example, the WCD 304 may communicate with a first AP, the first AP may communicate with a second AP, and the second AP may communicate with the peripheral device 308.

Oftentimes, a WCD and/or a peripheral device may operate based at least in part on using a battery as an energy source. Using a battery provides mobility to the WCD and/or the peripheral device by enabling the device to operate without a wired link that would otherwise tether the WCD and/or the peripheral device to a fixed location. Accordingly, the use of a battery enables the WCD and/or the peripheral device to freely change locations. In some aspects, a size of the WCD and/or the peripheral device may determine a power capacity and/or battery size of the battery included in the device. Accordingly, a smaller device (e.g., the peripheral device) may include a smaller battery with less power capacity relative to a larger device (e.g., the WCD).

One way to reduce power consumption and/or increase a duration of a battery life pertains to the device operating in a power saving mode that is associated with the device iteratively and/or periodically transitioning between an active state and a sleep state. While operating in a sleep state, the associated device may refrain from transmitting, receiving, and/or processing wireless communications. While operating in an active state, the associated device may transmit, receive, and/or process the wireless communications. The device may use different durations for operating the sleep state and the active state. For example, a first duration that is associated with operating in the sleep state may be longer than a second duration that is associated with the active state. Increasing the duration of a sleep state may result in increased power savings. However, the use of a power saving mode that includes a sleep state and an active state may introduce complications in synchronizing wireless communications between the WCD and the peripheral device. Alternatively, or additionally, the use of a power saving mode may result in the peripheral device extending the duration of a wake state, resulting in increased power consumption by the peripheral device and/or a reduced battery life of a battery at the peripheral device.

FIG. 3A illustrates a first example 300 of interactions between the WCD 304, the AP 306, and the peripheral device 308. In the first example 300, the WCD 304 and peripheral device 308 do not operate in respective power saving modes.

In some aspects, and as shown by FIG. 3A, the WCD 304 may communicate with the peripheral device 308 based at least in part on communicating with the AP 306. To illustrate, and as shown by reference number 310, the WCD 304 may transmit, to the AP 306 at time 11, an XPAN synchronization message (shown with a solid arrow) that is addressed to the peripheral device 308. To illustrate, the WCD 304 may transmit the XPAN synchronization message to trigger and/or capture instantaneous time measurements associated with time differences between the WCD 304 and the peripheral device 308. As shown by reference number 312, the AP 306 may forward, relay, and/or transmit the XPAN synchronization message to the peripheral device 308 shortly after receiving the XPAN synchronization message from the WCD 304 (e.g., with a processing delay and/or without an intentional delay). As shown by FIG. 3A, the XPAN synchronization message may arrive at the peripheral device 308 at time 12. Based at least in part on receiving the XPAN synchronization message, the peripheral device 308 may transmit, to the AP 306 at time 13, an XPAN synchronization response message (shown with a dash-dot arrow) that is addressed to the WCD 304. As shown by reference number 316, the AP 306 may forward, relay, and/or transmit the XPAN synchronization response message to the WCD 304, and the XPAN synchronization response message may arrive at the WCD 304 at time 14.

In some aspects, the WCD 304 may calculate time synchronization information based at least in part on the XPAN synchronization message and the XPAN synchronization response message. To illustrate, the WCD 304 and the peripheral device may not share a common clock (e.g., in a mesh network), and the WCD 304 may calculate, as the time synchronization information, adjustments that may be applied at the peripheral device 308 to help align a first clock at the peripheral device 308 with a second clock at the WCD 304 and/or indicate a transmission time for the WCD 304 to transmit a communication to the peripheral device. In some aspects, the WCD 304 may calculate the time synchronization information based at least in part on an assumption that a first transmission duration 318 that is associated with a send path (e.g., from the WCD 304 to the peripheral device 308) and a second transmission duration 320 on a return path (e.g., from the peripheral device 308 to the WCD 304) are symmetrical and/or have commensurate transmission durations. For example, the WCD 304 may calculate the timing information based at least in part on the following formulas:

$$\text{Path\_Delay} = \frac{(t_4 - t_1) - (t_3 - t_2)}{2} \tag{1}$$

$$\text{Time\_Offset} = (t_2 - t_1) - \text{Path\_Delay} \tag{2}$$

$$TSF_{est} = TSF_{SoftAP} + \text{Time\_Offset} \tag{3}$$

where $TSF_{est}$ represents an estimation of the first clock at the peripheral device 308 (e.g., a time-to-play software clock (TSF)), and $TSF_{SoftAP}$ is the second clock at the WCD 304 (e.g., another TSF). As shown by reference number 322, the WCD 304 may transmit, to the AP 306, an XPAN synchronization time message (shown with a dash-dash-dot arrow) that is addressed to the peripheral device 308 and is based at least in part on the timing synchronization information. As shown by reference number 324, the AP 306 may forward, relay, and/or transmit the XPAN synchronization time message to the peripheral device 308.

Differences in successive clock offset estimates as described with regard to equation (2) may be used to calculate a drift of the clock offset over time. As one example, the clock drift may be calculated (e.g., by the WCD 304 and/or a peripheral device 308) based at least in part on the following equations:

$$TimeDifference = \text{time}_2 - \text{time}_1 \tag{4}$$

$$OffsetDifference = \text{clock offset}_2 - \text{clock offset}_1 \tag{5}$$

$$EstimatedDrift = OffsetDifference / TimeDifference \tag{6}$$

where $\text{time}_2$ represents a second time associated with the latest clock offset estimation, $\text{time}_1$ represents a first time associated with the last (or a prior) clock offset estimation, $\text{clock offset}_2$ represents the latest clock offset estimation, and $\text{clock offset}_1$ represents the last (or a prior) clock offset estimation.

For battery-operated devices, such as the WCD 304 and the peripheral device 308, the first transmission duration of the send path and the second transmission duration of the receive path may be asymmetrical based at least in part on one or both devices operating in a power saving mode. The lack of symmetry may introduce errors in the time synchronization calculations performed by the WCD 304 and, subsequently, result in errors in synchronizing the first clock at the WCD 304 with the second clock at the peripheral device 308 and/or the WCD 304 transmitting a communication to the peripheral device 308 at a point in time that causes the peripheral device 308 to extend a duration of an awake window and/or an active state.

FIG. 3B illustrates a second example 302 of interactions between the WCD 304, the AP 306, and the peripheral device 308. In the second example 302, the WCD 304 and peripheral device 308 each operate in a respective power saving mode, but in other examples, the WCD 304 may refrain from operating in an energy saving mode (or vice versa with the peripheral device 308).

As shown by reference number 322, and based at least in part on operating in an active state of a power saving mode, the WCD 304 may transmit, to the AP 306, an XPAN synchronization message that is addressed to the peripheral device 308. Based at least in part on completing transmission of the XPAN synchronization message, the WCD 304 may transition to a sleep state. In some aspects, and as shown by reference number 324, the AP 306 may delay forwarding, relaying, and/or transmitting the XPAN synchronization message to the peripheral device 308. As one example, the AP 306 may have information that indicates that the peripheral device 308 is operating in a sleep state and may determine to delay transmission of the XPAN synchronization message. For instance, the peripheral device 308 may transmit an indication of a power saving mode configuration and/or timing parameters associated with the sleep state of the peripheral device 308 to the AP 306. Accordingly, and as shown by reference number 326, the AP 306 may forward, relay, and/or transmit the XPAN synchronization message such that the XPAN synchronization message arrives at the peripheral device 308 at time $t'_2$ and/or during an awake window 328 (shown with a bold dashed line) of the peripheral device 308. In some aspects, "awake window" may denote a duration and/or time window that is associated with a device operating in an active state.

At time $t'_3$, the peripheral device 308 may transmit, to the AP 306, an XPAN synchronization response message (shown with a dash-dot arrow) that is addressed to the WCD 304. However, and as shown by reference number 330, the AP 306 may delay forwarding, relaying, and/or transmitting the XPAN synchronization response message to the WCD 304. To illustrate, and in a similar manner as described above, the AP 306 may have information that indicates that the WCD 304 is operating in a sleep state and may determine to delay transmission of the XPAN synchronization response message. For instance, the WCD 304 may transmit an indication of a power saving mode configuration and/or timing parameters associated with the sleep state of the WCD 304 to the AP 306. Accordingly, and as shown by reference number 332, the AP 306 may forward, relay, and/or transmit the XPAN synchronization response message with a delay such that the XPAN synchronization message arrives at the WCD 304 at time $t'_4$ and/or during an awake window 334 of the WCD 304.

The WCD 304 and/or the peripheral device 308 operating in respective power saving modes and/or the AP 306 delaying transmission of the corresponding XPAN messages may result in asymmetric send path and receive path durations. That is, a first transmission duration 336 that is associated with a send path and a second transmission duration 338 on a return (receive) path may have different lengths. Asymmetrical send and receive paths may result in the WCD 304 calculating timing information that includes errors based at least in part on using one or more formulas that are based at least in part on symmetrical propagation delays as described above. In some aspects, errors in the timing information and/or the asymmetrical propagation paths may result in the WCD 304 transmitting user data to the peripheral device 308 at a point in time that causes the peripheral device to extend a duration of an awake window to recover the user data. Extending a duration of an awake window and/or an active state may result in additional power consumption by the peripheral device and/or a shorter battery life of a battery at the peripheral device. Alternatively, or additionally, the timing errors may result in errors at the peripheral device 308, such as playback errors associated with audio output by the peripheral device 308.

Some techniques and apparatuses described herein provide synchronization between a wireless communication device and a peripheral device. In some aspects, a WCD may perform a clock tracking procedure that uses at least an XPAN synchronization message pair and an XPAN synchronization response message pair. The WCD may transmit, to an AP, an XPAN synchronization message pair that is addressed to a peripheral device associated with the WCD. In some aspects, the XPAN synchronization message pair includes at least a first XPAN synchronization message and a second XPAN synchronization message, and the WCD may transmit the first XPAN synchronization message at a first time and the second XPAN synchronization message at a second time. That is, the WCD may transmit each XPAN synchronization message of the XPAN synchronization message pair at different times.

The WCD may receive, from the AP, an XPAN synchronization response message pair that is associated with the XPAN synchronization message pair. In some aspects, the XPAN synchronization response message pair includes a first XPAN synchronization response message and a second XPAN synchronization response message. The first XPAN synchronization response message may be based at least in part on the first XPAN synchronization message, and the second XPAN synchronization response message may be based at least in part on the second XPAN synchronization message. Alternatively, or additionally, the XPAN synchronization response message pair may indicate that the peripheral device is a transmission source of the XPAN synchronization response message pair. Based at least in part on receiving the XPAN synchronization response message pair, the WCD may transmit, to the AP, user data that is addressed to the peripheral device at a time that is based at least in part on an estimated awake window of the peripheral device. In some aspects, the WCD may calculate the estimated awake window based at least in part on the XPAN synchronization response message pair, as described below.

The use of an XPAN synchronization message pair in combination with an XPAN synchronization message response pair may enable a WCD to calculate timing information associated with an awake window of a peripheral device as described below, and reduce power consumption by the peripheral device, such as by mitigating the peripheral device extending a duration of an awake window and/or active state. To illustrate, the WCD may calculate a first time that is structured to reduce a transmission delay in a transmission path (e.g., a send path) from the WCD to the peripheral device (e.g., reducing a delay added at an AP). In some aspects, the WCD may transmit an XPAN synchronization message and/or an XPAN synchronization time message to the AP based at least in part on the first time, such that the AP may forward, relay, and/or transmit the XPAN synchronization to the peripheral device at a second time that mitigates the peripheral device extending a duration of the awake window and/or enables the peripheral device to use a minimum duration for the wake up window. Mitigating the peripheral device extending a duration of an awake window may reduce power consumption by the peripheral device, and/or extend a battery life of a battery at the peripheral device. In some aspects, the WCD may remain in an active state until receipt of an XPAN synchronization response message pair.

Alternatively, or additionally, the use of the XPAN synchronization message pair in combination with the XPAN synchronization message response pair may enable a WCD to calculate timing information associated with synchronizing a first clock at the WCD with a second clock at a peripheral device. To illustrate, based at least in part on receiving the XPAN synchronization response message pair, the WCD may calculate timing information that may be used to synchronize a first clock (e.g., a first TSF clock) at the WCD with a second clock (e.g., a second TSF clock) at a peripheral device, and the peripheral device may output user data based at least in part on the second (synchronized) clock. Synchronizing clocks between a WCD and a peripheral device may mitigate output errors at the peripheral device. Alternatively, or additionally, and based at least in part on the WCD having a larger power capacity relative to the peripheral devices, calculations for estimating the awake window of the peripheral device may be offloaded and/or performed by the WCD without additional computations by the peripheral device, which may also mitigate power consumption by the peripheral device, and/or extend a battery life of a battery at the peripheral device.

Alternatively, or additionally, as described below, the use of an XPAN synchronization message pair may enable the WCD to identify and/or mitigate scenarios that result in additional power consumption by the peripheral device and/or reduce the battery life of the battery at the peripheral device. For example, as described with regard to FIG. 5 and FIG. 6, the use of an XPAN synchronization message pair may enable the WCD to identify a first scenario associated with a first transmission arriving earlier than expected at the peripheral device and/or a second scenario associated with a second transmission arriving later than expected at the peripheral device.

The use of an XPAN synchronization message pair in combination with an XPAN synchronization message response pair may also enable a WCD to estimate the awake window of a peripheral device without the peripheral device modifying how messages are transmitted to the WCD and/or modifying a configuration of a power saving mode at the peripheral device. For example, the WCD may calculate timing estimations associated with the awake window of the peripheral device without the peripheral device modifying a periodicity, and/or a duration associated with the peripheral device transitioning between an active state and a sleep state.

As indicated above, FIGS. 3A and 3B are provided as examples. Other examples may differ from what is described with regard to FIGS. 3A and 3B.

Figure 4:
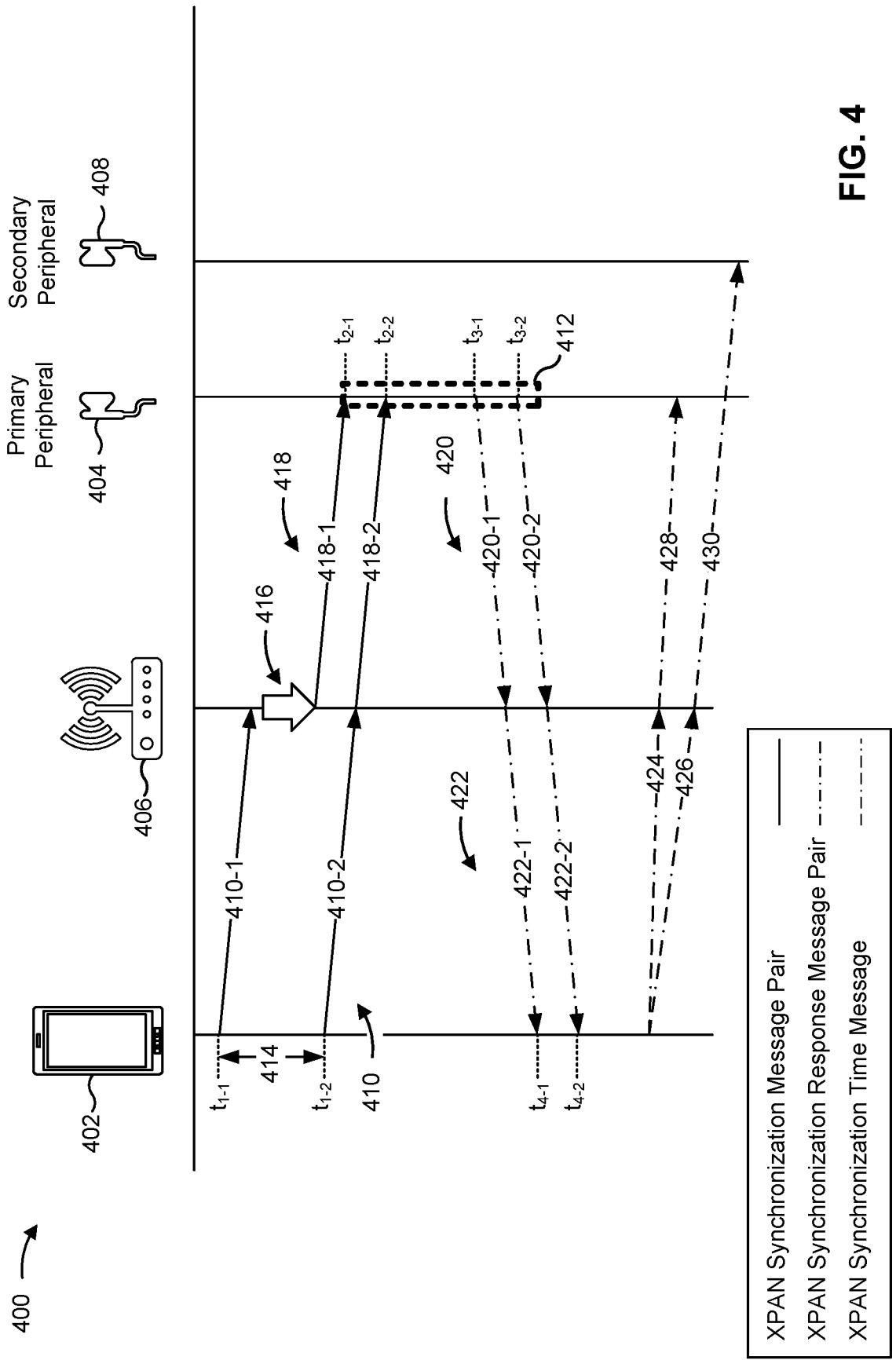
FIG. 4 is a diagram illustrating an example of a wireless communication process between a WCD, a primary peripheral device, an AP, and a secondary peripheral device, in accordance with the present disclosure.

FIG. 4 is a diagram illustrating an example 400 of wireless communication process between a WCD 402 (e.g., a device 115), a primary peripheral device 404 (e.g., another device 115, a wireless earbud 130-a, and/or a wireless earbud 130-b), an AP 406 (e.g., an AP 105), and a secondary peripheral device 408 (e.g., another device 115, a wireless earbud 130-a, and/or a wireless earbud 130-b), in accordance with the present disclosure. For visual clarity, the example 400 includes a single AP 406 between the WCD 402 and the pair of peripheral devices, but other examples may include multiple APs between the WCD 402 and the pair of peripheral devices. In some aspects, one or more of the signaling transactions in the communication process may be included as at least part of a clock tracking procedure that is used by the WCD 402 to obtain timing information associated with an awake window at the primary peripheral device 404 and/or timing information associated with synchronizing clocks as described below.

As shown by reference number 410, the WCD 402 may transmit, and the AP 406 may receive, an XPAN synchronization message pair that includes a first XPAN synchronization message (shown with a first solid line arrow) and a second XPAN synchronization message. As one example, the WCD 402 may transmit the first XPAN synchronization message and the second XPAN synchronization message at different times. For example, and as shown by reference number 410-1, the WCD 402 may transmit the first XPAN synchronization message at a first time that is shown as time $t_{1-1}$ and, as shown by reference number 410-2, the WCD 402 may transmit the second XPAN synchronization message at a second time that is shown as time $t_{1-2}$. In some aspects, the first XPAN synchronization message and the second XPAN synchronization message may be addressed to the primary peripheral device 404. That is, the WCD 402 may indicate that the primary peripheral device 404 is a destination address of the XPAN synchronization message pair.

In some aspects, the WCD 402 may select the first time and the second time based at least in part on one or more estimated timing metrics that are associated with a wireless network and/or the primary peripheral device 404. As one example, the WCD 402 may calculate, as an estimated timing metric, a network jitter metric and/or an estimated awake duration associated with the primary peripheral device 404. For instance, the WCD 402 may calculate the estimated timing metric(s) as part of establishing a connection with the primary peripheral device 404 and/or based at least in part on a trigger event associated with generating the estimated timing metrics.

To illustrate, the WCD 402 may calculate the network delay based at least in part on one or more of the formulas described above and/or based at least in part on the WCD 402 and/or the primary peripheral device 404 operating with a power saving mode disabled. For instance, the WCD 402 may transmit an XPAN synchronization message to the AP 406 and the AP 406 may forward, relay, and/or transmit the XPAN synchronization message to the primary peripheral device 404 during a time span that is associated with a respective power saving mode being disabled at each device. Alternatively, or additionally, the primary peripheral device 404 may transmit an XPAN synchronization response message to the AP 406 and the AP 406 may forward, relay, and/or transmit the XPAN synchronization response message to the WCD 402 during the time span. Accordingly, the WCD 402 may generate an initial estimate of a network delay and/or a network jitter based at least in part measuring a round-trip time (RTT) on messages that are transmitted during the time span when the respective power saving modes are disabled.

In some aspects, the WCD 402 may generate and/or estimate one or more timing metrics based at least in part on detecting a trigger event, such as a first trigger event associated with an expected event (e.g., roaming) and/or a second trigger event that is associated with a network delay satisfying a change threshold. To illustrate, based at least in part on detecting the first trigger event and/or the second trigger event, the AP 406 may calculate and/or estimate a network jitter metric and/or a network delay metric.

Alternatively, or additionally, and as part of establishing a connection with the WCD 402, the primary peripheral device 404 may transmit, and the AP 406 may receive, initial timing information that is associated with a future awake window of the primary peripheral device 404, such as an expected start time of the future awake window (e.g., an expected wake up time), a periodicity associated with an active state, and/or a duration of the active state. Accordingly, the WCD 402 may calculate the first time and/or the second time based at least in part on estimated timing metrics and/or initial timing metrics. To illustrate, the WCD 402 may calculate, as the first time, a point in time that is configured to cause the first XPAN synchronization message to arrive at the AP 406 prior to a start of an awake window 412 that is associated with the primary peripheral device 404 operating in an active state. That is, the WCD 402 may calculate the first time based at least in part on a first time offset that is relative to an estimated start time of the awake window 412 (e.g., the first time offset occurs prior to the estimated start time of the awake window 412) and is configured to cause the first XPAN synchronization message to arrive at the AP 406 prior to a start of an awake window 412. The WCD 402 may calculate the first time based at least in part on a first target window that represents a percentage of accuracy in an arrival time (e.g., +/−5% accuracy relative to a desired arrival time). In some aspects, and based at least in part on receiving the initial timing information (e.g., the expected wake up time, the periodicity, and/or the duration), the WCD 402 may commence and/or start a clock tracking procedure that is based at least in part on an XPAN synchronization message pair and an XPAN synchronization response message pair as described herein.

In some aspects, and as shown by reference number 410-2, the WCD 402 may delay transmission of the second XPAN synchronization message by a duration 414 that is relative to the transmission of the first XPAN synchronization message (e.g., time $t_{1-1}$). That is, the WCD 402 may transmit the second XPAN synchronization message at a time that is shown as time $t_{1-2}$, and $t_{1-1}$ and $t_{1-2}$ may be separated by the duration 414. In some aspects, the WCD 402 may calculate the duration 414 based at least in part on any combination of the network jitter metric, the estimated awake duration associated with the primary peripheral device 404, and/or a coder-decoder (codec) bit rate that is associated with user data (e.g., audio data and/or voice data). Alternatively, or additionally, the WCD 402 may calculate the duration 414 to cause the second XPAN synchronization message to arrive, by way of the AP 406, at the primary peripheral device 404 during the awake window 412. That is, the WCD 402 may calculate the second time based at least in part on a second time offset that is relative to the duration 414 of the awake window 412 and is configured to cause the second XPAN synchronization message to arrive at the primary peripheral device 404 during the duration 414. The WCD 402 may calculate the second time based at least in part on a second target window that represents a percentage of accuracy in an arrival time of the second XPAN synchronization message (e.g., +/−5% accuracy relative to a desired arrival time).

In some aspects, the WCD 402 may remain in an active state based at least in part on transmitting the XPAN synchronization message pair. For example, the WCD 402 may operate with a power saving mode enabled as described with regard to FIG. 3B. The WCD 402 may refrain from transitioning to a sleep state and/or may remain in an awake state until reception of an associated XPAN synchronization response message pair as described with regard to reference number 422 and/or until expiration of a timer. The transmission of the XPAN synchronization message pair may implicitly indicate (e.g., to the AP 406) that the WCD 402 is remaining and/or operating in the active state. Alternatively, or additionally, the WCD 402 may transmit a message that includes an explicit indication that the WCD 402 is remaining and/or operating in the active state.

As shown by reference number 416, the AP 406 may introduce an intentional delay in the transmission of the first XPAN synchronization message to the primary peripheral device 404. For example, based at least in part on receiving the first XPAN synchronization message during a time span associated with the primary peripheral device 404 operating in a sleep state, the AP 406 may delay forwarding, relaying, and/or transmitting the first XPAN synchronization message to the primary peripheral device 404. That is, the AP 406 may forward, relay, and/or transmit the XPAN synchronization message at a second point in time that is configured to result in the first XPAN synchronization message arriving at the primary peripheral device 404 at a start of the awake window 412 and/or when the peripheral device is scheduled to operate in an active state. In some aspects, the AP 406 may calculate the second point in time based at least in part on timing information that indicates a start time, a duration, and/or an end time associated with the awake window 412 of the primary peripheral device 404.

As shown by reference number 418, the AP 406 may forward, relay, and/or transmit, and the primary peripheral device 404 may receive, the XPAN synchronization message pair. To illustrate, and as shown by reference number 418-1 and by reference number 418-2, the AP 406 may transmit the first XPAN synchronization message to the primary peripheral device 404 at a separate time than the second XPAN synchronization message. In some aspects, the AP 406 may select and/or calculate a first AP transmission time for the first XPAN synchronization message that is configured to cause the first XPAN synchronization message to arrive at the primary peripheral device 404 at a third time that is shown as time $t_{2-1}$. That is, the AP 406 may calculate the AP transmission time based at least in part on targeting the first XPAN synchronization message 410-1 to arrive at the primary peripheral device 404 at a start, or shortly after the start, of the awake window 412. Alternatively, or additionally, the AP 406 may transmit the second XPAN synchronization message based at least in part on a second AP transmission time that is targeted and/or configured to cause the second XPAN synchronization message to arrive at the primary peripheral device 404 during the awake window 412 (shown a fourth time labeled as time $t_{2-2}$). In some aspects, the AP 406 may transmit the second XPAN synchronization with minimal delay (e.g., processing delay and/or without an intended delay). A duration between the arrival of the XPAN synchronization pair at the primary peripheral device 404 (e.g., $t_{2-1}$ and $t_{2-2}$) may be shorter than the duration 414 between transmission of the messages included in the XPAN synchronization message pair by the WCD 402. That is, the duration between the arrival of the XPAN synchronization pair at the primary peripheral device 404 may be shorter than the duration 414 based at least in part on the AP 406 introducing an intentional delay before transmitting the first XPAN synchronization message, as described with regard to reference number 416.

As shown by reference number 420, the primary peripheral device 404 may transmit, and the AP 406 may receive, an XPAN synchronization response message pair that includes a first XPAN synchronization message. To illustrate, and as shown by reference number 420-1, the primary peripheral device 404 may transmit a first XPAN synchronization response message (shown with a first dash-dot line arrow) at a fifth time (shown as time $t_{3-1}$) and, as shown by reference number 420-2, may transmit a second XPAN synchronization response message (shown with a second dash-dot line arrow) at a sixth time (shown as time $t_{3-2}$). The first XPAN synchronization response message and the second XPAN synchronization response message may be addressed to the WCD 402. That is, the WCD 402 may be an intended recipient of the XPAN synchronization response message pair.

The primary peripheral device 404 may transmit the first XPAN synchronization response message based at least in part on receiving the first XPAN synchronization message. Alternatively, or additionally, the primary peripheral device 404 may transmit the second XPAN synchronization response message based at least in part on receiving the second XPAN synchronization message. Accordingly, the fifth time associated with the transmission of the first XPAN synchronization response message (e.g., $t_{3-1}$) may be based at least in part on a reception time of the first XPAN synchronization message (e.g., $t_{2-1}$) and/or the sixth time associated with the transmission of the second XPAN synchronization response message (e.g., $t_{3-2}$) may be based at least in part on the reception time of the second XPAN synchronization message (e.g., $t_{2-2}$). Accordingly, a first time span between $t_{2-1}$ and $t_{3-1}$ may be commensurate with a second time span between $t_{2-2}$ and $t_{3-2}$. That is, the primary peripheral device 404 may refrain from introducing an intentional delay in transmitting each respective XPAN synchronization response message in the XPAN synchronization response message pair.

In some aspects, each XPAN synchronization response message may include respective timing information. For example, the primary peripheral device 404 may include, in each respective XPAN synchronization response message, time span information that indicates when the respective XPAN synchronization message was received relative to a start of the awake window 412, a start time of the awake window 412, and/or a reception time of the respective XPAN synchronization message.

As shown by reference number 422, the AP 406 may forward, relay, and/or transmit, and the WCD 402 may receive, the XPAN synchronization response message pair. For example, and as shown by reference number 422-1 and by reference number 422-2, the AP 406 may transmit the first XPAN synchronization response message and the second XPAN synchronization response message at separate times and/or in separate transmissions. In some aspects, the AP 406 may transmit the XPAN synchronization response message pair to the WCD 402 based at least in part on information that indicates that the WCD 402 is operating in an active state. As described above, the information may be implicit (e.g., indicated by the receipt of the XPAN synchronization message pair) or explicit (e.g., indicated by the WCD 402). The AP 406 may transmit the first XPAN synchronization response message and the second XPAN synchronization response message to the WCD 402 without an intentional delay, such as the intentional delay described with regard to reference number 416.

As shown by FIG. 4, the WCD 402 may receive the first XPAN synchronization response message at a seventh time that is shown as time $t_{4-1}$ and/or the second XPAN synchronization response message at an eighth time that is shown as time $t_{4-2}$. In some aspects, the WCD 402 may calculate one or more timing metrics based at least in part on the XPAN synchronization message pair, the XPAN synchronization response message pair, and/or timing information indicated by the XPAN synchronization response message pair. For example, the WCD 402 may calculate the timing metrics based on any combination of $t_{1-1}$, $t_{1-2}$, $t_{4-1}$, $t_{4-2}$, and/or timing information indicated by the XPAN synchronization response message pair. As one example, the WCD 402 may calculate one or more RTT metrics, such as a first RTT metric that is associated with the first XPAN synchronization message and the first XPAN synchronization response message based at least in part on $t_{1-1}$ and $t_{4-1}$. Alternatively, or additionally, the WCD 402 may calculate a second RTT metric that is associated with the second XPAN synchronization message and the second XPAN synchronization response message based at least in part on $t_{1-2}$ and $t_{4-2}$. In some aspects, the WCD 402 may calculate one or more timing metrics that are associated with the awake window 412. For instance, the second RTT metric may provide an indication on when the awake window 512 occurs. Alternatively, or additionally, the WCD 402 may estimate and/or calculate a network delay and/or a network jitter based at least in part on any combination of the first RTT, the second RTT, and/or a start time associated with the awake window.

As shown by reference number 424, the WCD 402 may transmit, and the AP 406 may receive, a first XPAN synchronization time message (shown with a first dash-dash-dot line arrow). Alternatively, or additionally, as shown by reference 426, the WCD 402 may transmit, and the AP 406 may receive, a second XPAN synchronization time message (shown with a second dash-dash-dot line arrow). The first XPAN synchronization time message may be addressed to the primary peripheral device 404 and/or the second XPAN synchronization time message may be addressed to the secondary peripheral device 408. The WCD 402 may indicate, via the first XPAN synchronization time message and/or the second XPAN synchronization time message, timing synchronization information and/or timing adjustments that may be used by the primary peripheral device 404 and/or the secondary peripheral device 408 to synchronize respective local clocks to a clock at the WCD 402. The timing synchronization information and/or timing adjustments may be calculated by the WCD 402 based at least in part on the XPAN synchronization message pair and/or the XPAN synchronization response message pair.

Alternatively, or additionally, the WCD 402 may use the timing information to calculate one or more transmission times associated with transmitting user data (e.g., high-fidelity audio user data, high-fidelity voice user data, motion tracking content, gaming content, XR content, spatial audio rendering content, and/or voice call processing content) to the primary peripheral device 404 and/or the secondary peripheral device 408. For example, the WCD 402 may using timing information associated with an awake window to identify a transmission time that reduces an awake duration of the primary peripheral device 404 and/or the secondary peripheral device 408 to preserve a battery life, as described above.

As shown by reference number 428, the AP 406 may forward, relay, and/or transmit, and the primary peripheral device 404 may receive, the first XPAN synchronization time message. As shown by reference number 430, the AP 406 may forward, relay, and/or transmit, and the secondary peripheral device 408 may receive, the second XPAN synchronization time message.

The WCD 402, the primary peripheral device 404, the AP 406, and/or the secondary peripheral device 408 may iteratively perform any aspect of the clock tracking procedure described with regard to the example 400. The ability to iteratively perform the clock tracking procedure may enable the WCD 402 to update timing estimations and/or timing calculations (e.g., an estimated network jitter, an estimated network delay, and/or awake window timing estimations) as operating conditions change. The ability to update timing estimations may enable the WCD 402 to preserve a battery life of a first battery at the primary peripheral device 404 and/or a second battery at the secondary peripheral device 408 as described herein.

To illustrate, based at least in part on operating with an enabled power saving mode, the WCD 402 may transition to a sleep state based at least in part on completing an iteration of the clock tracking procedure. Based at least in part on transitioning to an awake state, the WCD 402 may initiate and/or perform an iteration of the clock tracking procedure. Accordingly, the WCD 402 may iteratively transition between an active state and a sleep state and/or may iteratively perform the clock tracking procedure at each transition to the active state. Alternatively, or additionally, the WCD 402 may perform the clock tracking procedure at each N-th transition to the active state, where N is an integer. To illustrate, the WCD 402 may perform the clock tracking procedure every second transition to the active state (e.g., N=2), every third transition to the active state (e.g., N=3) and/or every fifth transition to the active state (e.g., N=5).

In some aspects, the WCD 402 may transmit, and the AP 406 may receive, a first XPAN synchronization follow up frame that is addressed to the primary peripheral device 404 and/or a second XPAN synchronization follow up frame that is addressed to the secondary peripheral device 408. In some aspects, an XPAN synchronization follow up frame indicates at least one timing metric that is associated with an estimated awake window that is calculated by the WCD 402. Accordingly, the AP 406 may transmit, and the primary peripheral device 404 may receive, the first XPAN synchronization follow up frame. Alternatively, or additionally, the AP 406 may transmit, and the secondary peripheral device 408, the second XPAN synchronization follow up frame.

The use of an XPAN synchronization message pair in combination with an XPAN synchronization message response pair may enable a WCD to calculate timing information associated with an awake window of a peripheral device and reduce power consumption by the peripheral device, such as by mitigating the peripheral device extending a duration of an awake window and/or active state. Mitigating the peripheral device extending a duration of an awake window may reduce power consumption by the peripheral device, and/or extend a battery life of a battery at the peripheral device. Alternatively, or additionally, the use of the XPAN synchronization message pair in combination with the XPAN synchronization message response pair may enable a WCD to calculate timing information that is associated with synchronizing a first clock at the WCD with a second clock at a peripheral device. Synchronizing clocks between a WCD and a peripheral device may mitigate output errors at the peripheral device.

As indicated above, FIG. 4 is provided as an example. Other examples may differ from what is described with regard to FIG. 4.

Figure 5:
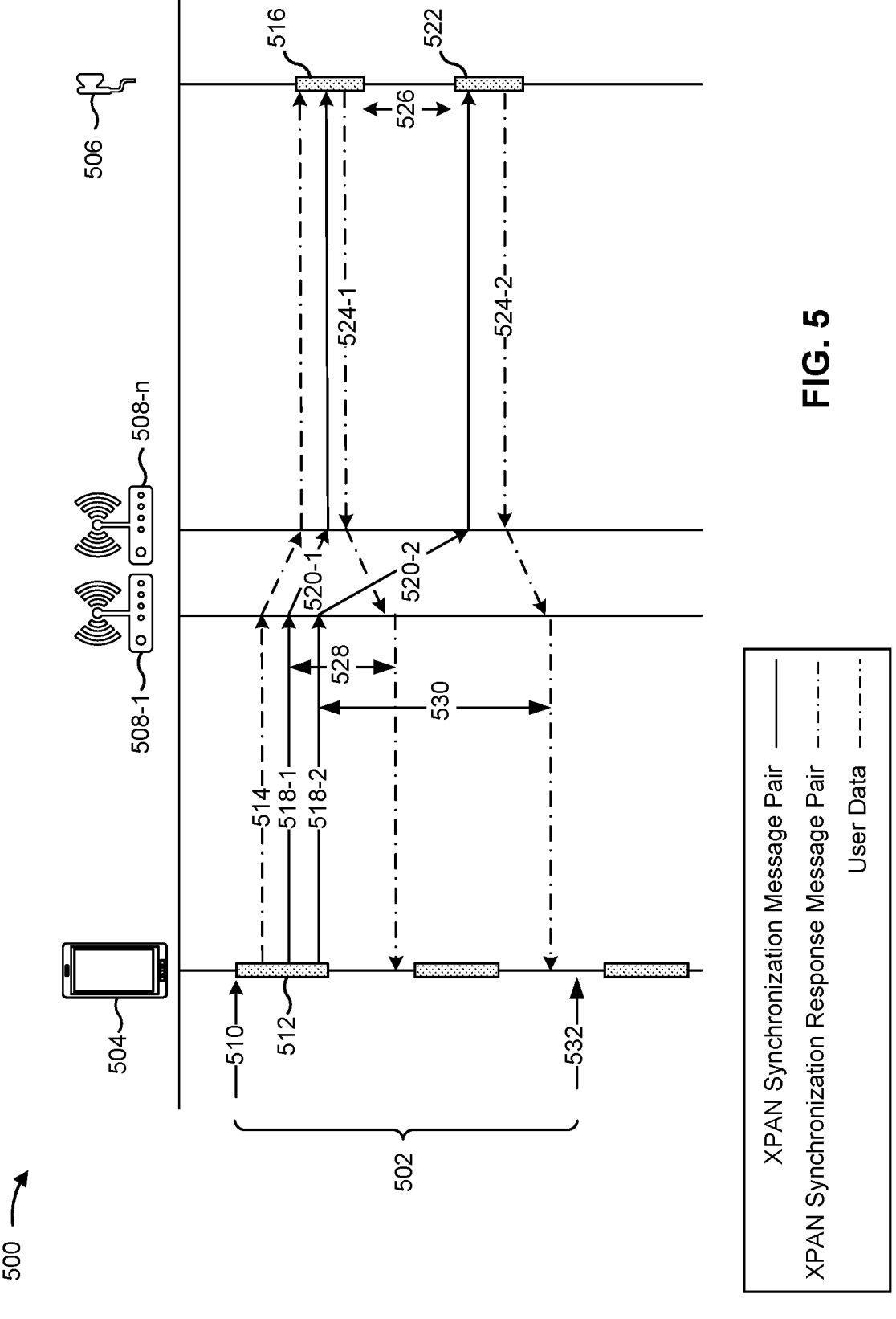
FIG. 5 is a diagram illustrating an example of a clock tracking procedure, in accordance with the present disclosure.

FIG. 5 is a diagram illustrating an example 500 of a clock tracking procedure 502, in accordance with the present disclosure. The example 500 includes a WCD 504 (e.g., a device 115) that communicates with a peripheral device 506 (e.g., a device 115, an earbud 130-1, and/or an earbud 130-2) based at least in part on one or more APs (e.g., one or more APs 105) that are shown as AP 508-1 to AP 508-n, where n is an integer.

In the example 500, the clock tracking procedure 502 represents a single iteration of a clock tracking procedure as described herein. The WCD 504 and the peripheral device 506 each operate in an enabled power saving mode such that each device transitions between a respective active state and sleep state. The respective awake windows for each device are shown by FIG. 5 through the use of shaded (via a dotted pattern) rectangles.

As shown by reference number 510, the WCD 504 may transition from a sleep state to an active state. Based at least in part on transitioning to the active state, the WCD 504 may initiate the clock tracking procedure 502. As part of performing the clock tracking procedure 502, the WCD 504 may determine to remain in the active state until completion of the clock tracking procedure. To illustrate, the WCD 504 may refrain from transitioning to the sleep state at the end of an awake window 512. As shown by reference number 514, the WCD 504 may transmit user data (shown with a dash-dash-dot line arrows) to the peripheral device 506 based at least in part on using the AP 508-1 and/or the AP 508-n. In some aspects, the WCD 504 may transmit the user data based at least in part on timing information associated with an awake window 516. That is, the WCD 504 may select a transmission time for the user data that is configured to result in the user data arriving at the peripheral device 506 at a start, or close to after the start, of the awake window 516.

As shown by reference number 518-1 and reference number 518-1, respectively, the WCD 504 may transmit an XPAN synchronization message pair (shown with a first solid line arrow and a second solid line arrow) as at least part of the clock tracking procedure 502. In a similar manner as the user data, the WCD 504 may transmit the XPAN synchronization message pair to the peripheral device 506 based at least in part on the AP 508-1 and/or the AP 508-n.

As shown by reference number 520-1, the AP 508-1 and/or the AP 508-n may transmit a first XPAN synchronization message of the XPAN synchronization message pair without an intentional delay. For example, the AP 508-1 and/or the AP 508-n may calculate that the first XPAN synchronization message is projected to arrive at the peripheral device 506 during the awake window 516. As shown by reference number 520-2, the AP 508-1 and/or the AP 508-n may transmit a second XPAN synchronization message of the XPAN synchronization message pair with an intentional delay. To illustrate, the AP 508-1 and/or the AP 508-n may calculate that the second XPAN synchronization message is projected to arrive at the peripheral device 506 after completion of the awake window 516. Accordingly, the AP 508-1 and/or the AP 508-n may delay transmission of the second XPAN synchronization message to a point in time that results in the second XPAN synchronization message arriving at the peripheral device 506 at a start and/or shortly after the start, of a second awake window 522.

As shown by reference number 524-1, the peripheral device 506 may transmit a first XPAN synchronization response message (shown with a first dash-dot line arrow) to the WCD 504 based at least in part on the AP 508-1 and/or the AP 508-n. That is, the peripheral device 506 may transmit the first XPAN synchronization response message during the awake window 516. In some aspects, the peripheral device 506 may transition to a sleep state, as shown by reference number 526. As described above, the peripheral device 506 may receive the second XPAN synchronization message at a start, or shortly after the start, of the second awake window 522 based at least in part on the AP 508-1 and/or the AP 508-2 introducing an intentional delay in the transmission of the second XPAN synchronization message. Accordingly, the peripheral device 506 may transmit a second XPAN synchronization response message (shown with a second dash-dot line arrow) during the awake window 522. In a similar manner as the first XPAN synchronization response message, the peripheral device 506 may transmit the second XPAN synchronization response message to the WCD 504 based at least in part on the AP 508-1 and/or the AP 508-*n*.

The WCD 504 may remain in the awake state for the duration of the clock tracking procedure 502. For instance, and as shown by FIG. 5, the WCD 504 may remain in the awake state through the duration of the awake window 516 at the peripheral device 506, the sleep state duration of the peripheral device 506 as shown by reference number 526, and/or for at least part of the second awake window 522. Based at least in part on receiving the entirety of the XPAN synchronization response message pair, the WCD 504 may calculate and/or estimate updated timing information as described with regard to FIG. 4. For example, the WCD 504 may calculate a first RTT metric as shown by reference number 528 and/or a second RTT metric as shown by reference number 530. The WCD 504 may compare the first RTT metric and the second RTT metric, and calculate that the peripheral device 506 transmitted the XPAN synchronization response message pair based at least in part on using multiple awake windows and/or that the peripheral device 506 transitioned to a sleep state in between transmitting the first XPAN synchronization response message and the second XPAN synchronization response message.

As described above, the XPAN synchronization response pair (e.g., the first XPAN synchronization response message and the second XPAN synchronization response message) may indicate timing information, such as time span information that indicates when the respective XPAN synchronization message was received relative to a start of an awake window (e.g., the awake window 516 and/or the awake window 522), a start time of the awake window, and/or a reception time of the respective XPAN synchronization message. The WCD 504 may use the timing information to determine if the XPAN synchronization message pair was received by the peripheral device 506 as expected (e.g., within a threshold of a start of a first awake window and/or within the threshold of a start to a second awake window) or late (e.g., later than within the threshold to the start of first awake window and/or the second awake window). Accordingly, the WCD 504 may adjust the transmission time of user data during a subsequent awake window of the WCD 504 and/or an XPAN synchronization message pair transmitted as part of a subsequent clock tracking procedure. As shown by reference number 532, the WCD 504 may transition to a sleep state upon completion of the clock tracking procedure 502.

As indicated above, FIG. 5 is provided as an example. Other examples may differ from what is described with regard to FIG. 5.

Figure 6:
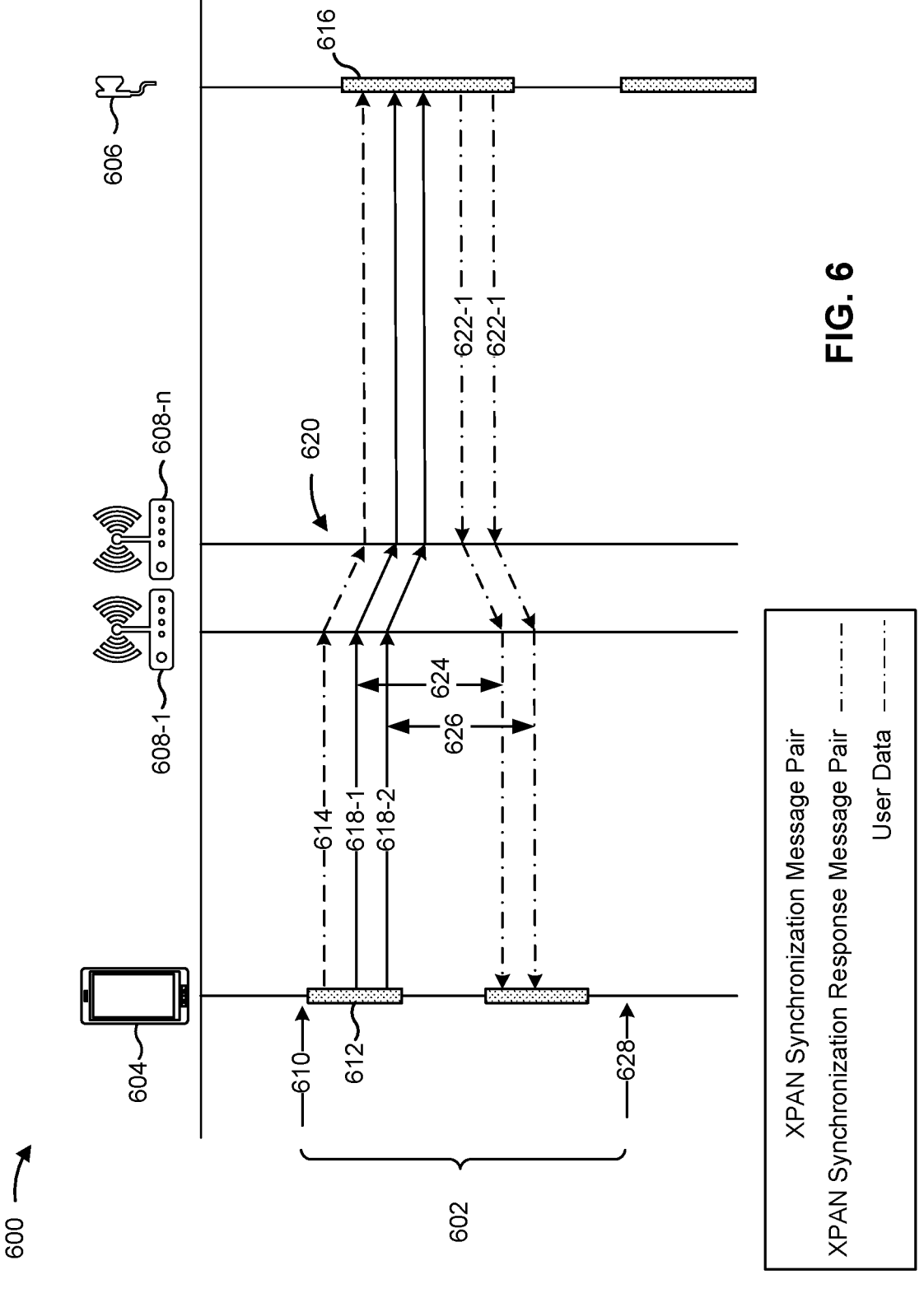
FIG. 6 is a diagram illustrating an example of a clock tracking procedure, in accordance with the present disclosure.

FIG. 6 is a diagram illustrating an example 600 of a clock tracking procedure 602, in accordance with the present disclosure. The example 600 includes a WCD 604 (e.g., a device 115) that communicates with a peripheral device 606 (e.g., a device 115, a wireless earbud 130-1, and/or a wireless earbud 130-2) based at least in part on one or more APs (e.g., one or more APs 105) that are shown as AP 608-1 to AP 608-*n*, where n is an integer.

In the example 600, the clock tracking procedure 602 represents a single iteration of a clock tracking procedure as described herein. The WCD 604 and the peripheral device 606 each operate in an enabled power saving mode such that each device transitions between a respective active state and sleep state. The respective awake windows for each device are shown by FIG. 6 through the use of shaded rectangles.

As shown by reference number 610, the WCD 604 may transition from a sleep state to an active state. Based at least in part on transitioning to the active state, the WCD 604 may initiate the clock tracking procedure 602. As part of performing the clock tracking procedure 602, the WCD 604 may determine to remain in the active state until completion of the clock tracking procedure. To illustrate, the WCD 604 may refrain from transitioning to the sleep state at the end of an awake window 612. As shown by reference number 614, the WCD 604 may transmit user data (shown with a dash-dash-dot line arrows) to the peripheral device 606 based at least in part on using the AP 608-1 and/or the AP 608-*n*. In some aspects, the WCD 604 may transmit the user data based at least in part on timing information associated with an awake window 616. That is, the WCD 604 may select a transmission time for the user data that is configured to result in the user data arriving at the peripheral device 606 at a start, or close to after the start, of the awake window 616.

As shown by reference number 618-1 and reference number 618-1, respectively, the WCD 604 may transmit an XPAN synchronization message pair (shown with a first solid line arrow and a second solid line arrow) as at least part of the clock tracking procedure 602. In a similar manner as the user data, the WCD 604 may transmit the XPAN synchronization message pair to the peripheral device 606 based at least in part on the AP 608-1 and/or the AP 608-*n*.

As shown by reference number 620, the AP 608-1 and/or the AP 608-*n* may transmit the XPAN synchronization message pair (e.g., both the first XPAN synchronization message and the second XPAN synchronization message) without an intentional delay. For example, the AP 608-1 and/or the AP 608-*n* may calculate that the first XPAN synchronization message and the second XPAN synchronization message are projected to arrive at the peripheral device 606 during the awake window 616.

As shown by reference number 622-1, the peripheral device 606 may transmit a first XPAN synchronization response message (shown with a first dash-dot line arrow) to the WCD 604 based at least in part on the AP 608-1 and/or the AP 608-*n*. Alternatively, or additionally, the peripheral device 606 may transmit a second XPAN synchronization response message (shown with a second dash-dot line arrow) during the awake window 616. In a similar manner as described with regard to FIG. 5, the peripheral device 606 may transmit the first XPAN synchronization response message and the second XPAN synchronization response message to the WCD 604 based at least in part on the AP 608-1 and/or the AP 608-*n*.

The WCD 604 may remain in the awake state for the duration of the clock tracking procedure 602. Based at least in part on receiving the entirety of the XPAN synchronization response message pair, the WCD 604 may calculate and/or estimate updated timing information as described with regard to FIG. 4. For example, the WCD 604 may calculate a first RTT metric as shown by reference number 624 and/or a second RTT metric as shown by reference number 626. The WCD 604 may compare the first RTT metric and the second RTT metric, and calculate that the peripheral device 606 transmitted the XPAN synchronization response message pair in a same awake window (e.g., the awake window 616).

As described above, the XPAN synchronization response pair (e.g., the first XPAN synchronization response message and the second XPAN synchronization response message) may indicate timing information, such as time span information that indicates when the respective XPAN synchronization message was received relative to a start of an awake window (e.g., the awake window 616), a start time of the awake window, and/or a reception time of the respective XPAN synchronization message. The WCD 604 may use the timing information to determine if the XPAN synchronization message pair was received by the peripheral device 606 as expected (e.g., within a threshold to a start of a first awake window and/or within the threshold of a start to a second awake window) or early (e.g., during a same awake window). Accordingly, the WCD 604 may adjust the transmission time of user data during a subsequent awake window of the WCD 604 and/or an XPAN synchronization message pair transmitted as part of a subsequent clock tracking procedure. As shown by reference number 628, the WCD 604 may transition to a sleep state upon completion of the clock tracking procedure 602.

As indicated above, FIG. 6 is provided as an example. Other examples may differ from what is described with regard to FIG. 6.

Figure 7:
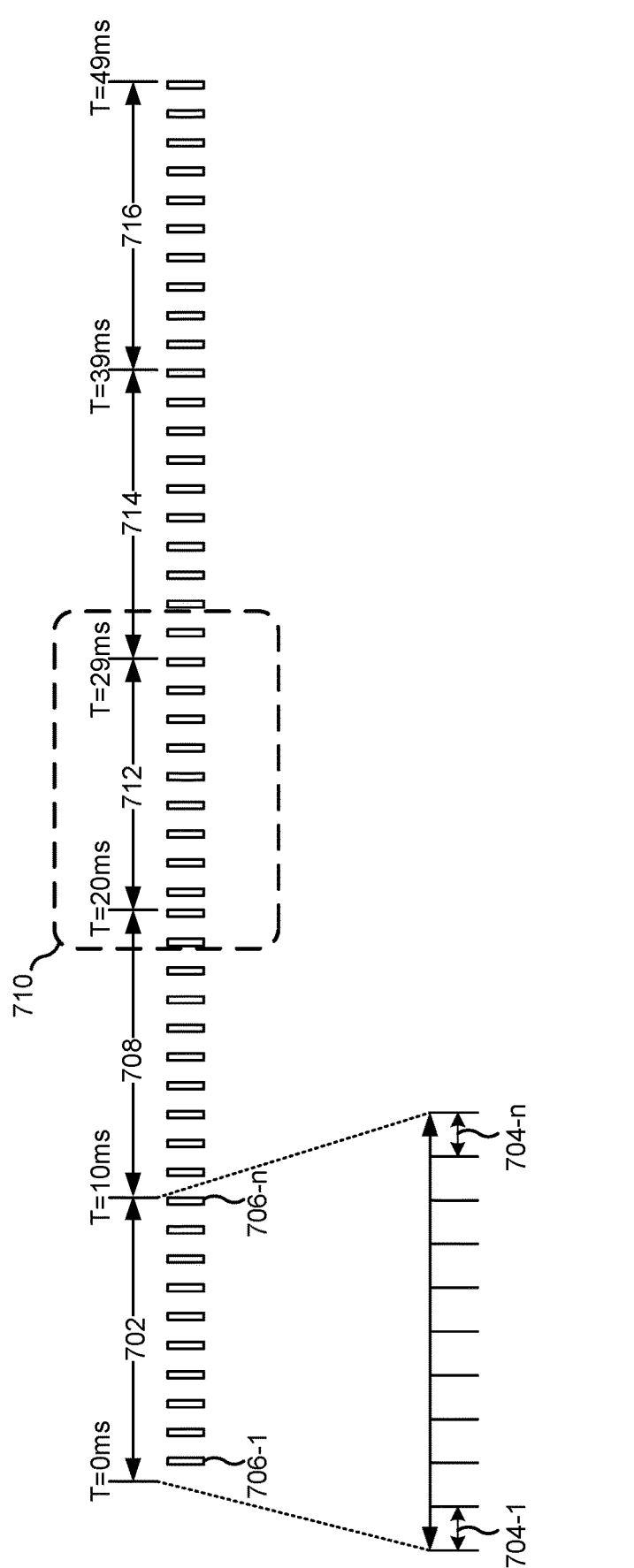
FIG. 7 is a diagram illustrating an example of encoding audio packets based at least in part on sub-intervals, in accordance with the present disclosure.

FIG. 7 is a diagram illustrating an example 700 of encoding audio packets based at least in part on sub-intervals, in accordance with the present disclosure.

In some aspects, a WCD (e.g., a device 115, a WCD 402, a WCD 504, a WCD 504, an apparatus 1000, and/or a device 1100) may include partitioned functionality using any combination of hardware, software, and/or firmware as described herein. For example, the WCD may include an audio encoder partition that encodes audio for playback, a clock tracking partition that performs aspects of a clock tracking procedure associated with a peripheral device as described herein, and/or a wireless communication partition that transmits and/or receives communications based at least in part on a protocol (e.g., a WiFi system on chip (SOC) that manages WiFi communications, a WLAN SOC that manages WLAN communications, and/or a wireless wide area network (WWAN) SOC that manages WWAN communications). Each partition may send information to and/or receive information from other partitions. To illustrate, the clock tracking partition may communicate clock tracking information (e.g., audio scheduling information and/or time estimations associated with an awake window at a peripheral device) to the audio encoder partition and/or the wireless communication partition. The audio encoder partition may communicate encoded audio packets to the wireless communication partition, and the encoded audio packets may be based at least in part on the clock tracking information. Alternatively, or additionally, the wireless communication partition may transmit the encoded audio packets based at least in part on the clock tracking information, such as by transmitting the encoded audio packets based at least in part on an estimated wake up window associated with a peripheral device.

In some aspects, the clock tracking partition may calculate updates to the clock tracking information (e.g., updates associated with an estimated wake up time and/or an estimated duration of the wake up window). Based at least in part on the updates to the clock tracking information, the audio encoder partition may adjust a communication time that is associated with the audio encoder partition communicating one or more encoded audio packets to the wireless communication partition. In some aspects, the audio encoder partition may adjust a length of an audio encoding interval. Alternatively, or additionally, and based at least in part on the updates to the clock tracking information, the wireless communication encoder may adjust a transmission time of the one or more encoded audio packets to a peripheral device, a peripheral device pair, and/or a peripheral device group. In some aspects, the wireless communication partition may transmit sequences of encoded audio packets in a single burst to save power.

As one example, the audio encoder partition and the wireless communication partition may change scheduling that is associated with the audio encoder partition communicating and/or delivering the encoded audio packets to the wireless communication partition and/or the wireless communication partition transmitting the encoded audio packets. Alternatively, or additionally, the audio encoder partition may adjust a length of an audio encoding interval. To illustrate, the audio encoder partition may adjust the length from 10 milliseconds (msec) to 9 msec to mitigate the encoded audio packets arriving at the peripheral device at a sub-optimal time. Accordingly, the audio encoder partition may adjust a length of the audio encoding interval, and the wireless communication partition may adjust a scheduled time associated with transmitting the encoded audio packets to the peripheral device(s). In some aspects, however, a codec may operate based at least in part on the audio encoding interval being consistent and/or uniform between a first frame and a second frame. For example, a modified discrete cosine transform (MDCT) codec may operate based at least in part on an assumption that audio data windowing (e.g., the audio encoding interval and/or related schemes for generating encoded audio packets) being consistent between input frames. That is, a codec may have an operating condition associated with uniform and/or consistent audio encoding intervals. Accordingly, modifying an audio encoding interval may result in failure at a receiving end, such as errors in recovering the encoded audio, based at least in part on the audio encoder partition changing the audio encoding interval to non-uniform lengths and failing to satisfy the operating condition of the codec.

In some aspects, the audio encoder partition may encode audio packets in an audio encoding interval based at least in part on using sub-intervals. That is, the encoding process may be based at least in part on using a uniform and/or consistent sub-interval length between audio frames. By encoding audio based at least in part on sub-intervals with a uniform length, the WCD may adjust a transmission time of the encoded audio packets (e.g., by way of the wireless communication partition) without adjusting an audio encoding interval for a codec (e.g., at the audio encoder partition at the WCD and/or a peripheral device). That is, the audio encoder partition may generate sub-interval encoded audio packets that are based at least in part on a uniform sub-interval length of an audio encoding interval, audio frame, and/or an audio interval, and may adjust a number of sub-interval encoded audio packets communicated to the wireless communication partition. Using the uniform sub-interval length may mitigate failure at the receiving end (e.g., mitigate recovery errors) based at least in part on the sub-interval length remaining consistent and satisfying an operating condition of a codec.

To illustrate, a first audio interval 702 may have a length of M msec, which is shown in FIG. 7 as spanning 0 to 10 msec and having a length of M=10 msec. In some aspects, the audio encoder partition may encode audio that spans the first audio interval 702 using audio encoding sub-intervals, such as uniform sub-intervals as shown by sub-interval 704-1 to sub-interval 704-n, where n is an integer. For instance, the audio encoder partition may generate first sub-interval encoded audio packet 706-1 based at least in part on audio included in sub-interval 704-1, and an n-th sub-interval encoded audio packet 706-n based at least in part on audio included in sub-interval 704-n. In the example 700, the first audio interval 702 is partitioned into N=10 sub-intervals (e.g., sub-interval 704-1 to sub-interval 704-n) that have a uniform length of 1 msec, and the audio encoder partition may generate N=10 sub-interval encoded audio packets based at least in part on a respective sub-interval of the first audio interval 702. Accordingly, the audio encoder partition may communicate and/or deliver N sub-interval encoded audio packets (e.g., 10 sub-interval encoded audio packets) to the wireless communication partition based at least in part on the first audio interval 702.

As described above, the audio encoder partition may use a uniform length for each sub-interval and/or for generating a sub-interval encoded audio packet. Accordingly, a second audio interval 708 that spans 10 msec to 20 msec may also include N=10 sub-partitions that have the uniform length of 1 msec, and the audio encoder partition may generate 10 sub-interval encoded audio packets based at least in part on audio included in the second audio interval 708. While the example 700 includes sub-intervals that are based at least in part on 1 msec of audio, other examples may be based at least in part on different sub-interval lengths. To illustrate, for streaming audio that is based at least in part on 192 kHz Lossless audio, the audio encoder partition may use sub-intervals that have a length of 4 msec. In some aspects, a length of a sub-interval may be based at least in part on a transmission size (e.g., a maximum transmission unit (MTU) packet size) that is associated with transmissions by the wireless communication partition.

As shown by reference number 710, the audio encoder partition may generate sub-interval encoded audio packets based at least in part on a third audio interval 712 that has a reduced length relative to the first audio interval 702 and the second audio interval 708. For instance, and as shown by FIG. 7, the third audio interval 712 may span 20 msec to 29 msec, resulting in an audio interval length of 9 msec. In some aspects, the audio encoder partition may use a reduced audio interval length (e.g., the third audio interval length 712) to generate the sub-interval encoded audio packets based at least in part on updates to the clock tracking information and/or changes to an estimation of a peripheral device wake up window (e.g., an estimated wake up time and/or an estimated wake up window duration). Although the third audio interval 712 may span a different duration relative to the first audio interval 702 and the second audio interval 708 (e.g., a shorter duration), the audio encoder partition may generate sub-interval encoded audio packets based at least in part on a uniform sub-interval length. That is, the audio encoder partition may generate the sub-interval encoded audio packets for the third audio interval 712 using a same sub-interval length that was used for the sub-interval encoded audio packets associated with the first audio interval 702 and the second audio interval 708. Accordingly, the audio encoder partition may deliver and/or communicate fewer sub-interval encoded audio packets to the wireless communication packet, but the sub-interval encoded audio packets are consistent and/or uniform with the other sub-interval encoded audio packets. Using the uniform sub-interval length may mitigate failure at the receiving end (e.g., mitigate recovery errors) based at least in part on the sub-interval length remaining consistent and satisfying an operating condition of a codec. As shown by reference number 714 and reference number 716, the audio encoder partition may return to using a larger audio interval length (e.g., 10 msec) after the modification shown by reference number 710.

The use of sub-intervals to generate sub-interval encoded audio packets enable a WCD to support differences between a peripheral device wake up window and an audio encoding interval, as well as changes to the peripheral device wake up window. Using sub-intervals to generate encoded audio packets also simplifies synchronizing encoded audio packet delivery by the audio encoder partition and transmission of the encoded audio packets by a wireless communication partition to a peripheral device that is operating with a power saving mode enabled. Using the uniform sub-interval length may also mitigate failure at the receiving end (e.g., by mitigating recovery errors) based at least in part on the sub-interval length remaining consistent and satisfying an operating condition of a codec.

As indicated above, FIG. 7 is provided as an example. Other examples may differ from what is described with regard to FIG. 7.

FIG. 8 is a diagram illustrating an example process 800 performed, for example, by a WCD, in accordance with the present disclosure. Example process 800 is an example where the WCD (e.g., a device 115, a WCD 402, a WCD 504, a WCD 504, an apparatus 1000, and/or a device 1100) performs operations associated with extended personal area network time synchronization between a wireless communication device and a peripheral device.

As shown in FIG. 8, in some aspects, process 800 may include performing a clock tracking procedure that includes: transmitting, to an AP, an XPAN synchronization message pair that is addressed to a peripheral device associated with the WCD, the XPAN synchronization message pair including a first XPAN synchronization message and a second XPAN synchronization message, the transmitting the XPAN synchronization message pair comprising transmitting the first XPAN synchronization message at a first time and the second XPAN synchronization message at a second time, receiving, from the AP, an XPAN synchronization response message pair that is associated with the XPAN synchronization message pair, the XPAN synchronization response message pair including a first XPAN synchronization response message and a second XPAN synchronization response message, the first XPAN synchronization response message being based at least in part on the first XPAN synchronization message and the second XPAN synchronization response message being based at least in part on the second XPAN synchronization message (block 810). For example, the WCD (e.g., using communication manager 140, depicted in FIG. 10) may perform a clock tracking procedure that includes: transmitting, to an AP, an XPAN synchronization message pair that is addressed to a peripheral device associated with the WCD, the XPAN synchronization message pair including a first XPAN synchronization message and a second XPAN synchronization message, the transmitting the XPAN synchronization message pair comprising transmitting the first XPAN synchronization message at a first time and the second XPAN synchronization message at a second time, receiving, from the AP, an XPAN synchronization response message pair that is associated with the XPAN synchronization message pair, the XPAN synchronization response message pair including a first XPAN synchronization response message and a second XPAN synchronization response message, the first XPAN synchronization response message being based at least in part on the first XPAN synchronization message and the second XPAN synchronization response message being based at least in part on the second XPAN synchronization message, as described above.

As further shown in FIG. 8, in some aspects, process 800 may include transmitting, to the AP, user data that is addressed to the peripheral device at a time that is based at least in part on an estimated awake window, the estimated awake window being based at least in part on the XPAN synchronization response message pair (block 820). For example, the WCD (e.g., using transmission component 1004 and/or communication manager 1006, depicted in FIG. 10) may transmit, to the AP, user data that is addressed to the peripheral device at a time that is based at least in part on an estimated awake window, the estimated awake window being based at least in part on the XPAN synchronization response message pair, as described above.

Process 800 may include additional aspects, such as any single aspect or any combination of aspects described below and/or in connection with one or more other processes described elsewhere herein.

In a first aspect, process 800 includes calculating a third time that is associated with transmitting the user data and is based at least in part on reducing an awake duration of the peripheral device, and transmitting the user data includes transmitting the user data based at least in part on the third time.

In a second aspect, process 800 includes calculating an estimated network jitter based at least in part on the WCD operating in a first disabled power saving mode and the peripheral device operating in a second disabled power saving mode.

In a third aspect, a time span between the first time and the second time is based at least in part on at least one of the estimated network jitter, a duration of the estimated awake window, or a codec bitrate associated with the user data.

In a fourth aspect, process 800 includes detecting a trigger event that is associated with a network delay, and calculating the estimated network jitter includes calculating the estimated network jitter based at least in part on detecting the trigger event.

In a fifth aspect, process 800 includes receiving an indication of an expected wake up time associated with an awake window that is associated with the peripheral device operating with an enabled power saving mode, and commencing the clock tracking procedure based at least in part on receiving the indication.

In a sixth aspect, process 800 includes calculating one or more timing metrics associated with the estimated awake window based at least in part on the XPAN synchronization response message pair.

In a seventh aspect, calculating the one or more timing metrics includes calculating, as a first timing metric of the one or more timing metrics, a first RTT based at least in part on the first XPAN synchronization message and the first XPAN synchronization response message, calculating, as a second timing metric of the one or more timing metrics, a second RTT based at least in part on the second XPAN synchronization message and the second XPAN synchronization response message, and calculating, as a third timing metric of the one or more timing metrics, a start time associated with the estimated awake window based at least in part on the first RTT and the second RTT.

In an eighth aspect, process 800 includes updating at least one of an estimated network jitter, or an estimated network delay, basing at least in part on at least one of the first RTT, the second RTT, or the start time.

In a ninth aspect, process 800 includes transmitting, based at least in part on receiving the XPAN synchronization response message pair, an XPAN synchronization follow up frame that indicates at least one timing metric that is associated with the estimated awake window.

In a tenth aspect, the clock tracking procedure further includes selecting the first time based at least in part on configuring the first XPAN synchronization message to arrive at the peripheral device at a first time offset that is relative to an estimated start time of the estimated awake window, and selecting the second time based at least in part on configuring the second XPAN synchronization message to arrive at the peripheral device at a second time offset that is relative to a duration of the estimated awake window.

In an eleventh aspect, process 800 includes operating in an enabled power saving mode that is associated with the WCD iteratively transitioning between an active state and a sleep state, and iteratively performing the clock tracking procedure at each N-th transition to the active state, and N is an integer.

In a twelfth aspect, the first XPAN synchronization response message indicates a first duration between a start of the estimated awake window and receipt of the first XPAN synchronization message by the peripheral device, and the second XPAN synchronization response message indicates a second duration between the start of the estimated awake window and receipt of the second XPAN synchronization message by the peripheral device.

In a thirteenth aspect, process 800 includes generating one or more sub-interval encoded audio data packets, and the user data includes the one or more sub-interval encoded audio data packets.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a peripheral device, in accordance with the present disclosure. Example process 900 is an example where the peripheral device (e.g., a device 115, a primary peripheral device 404, a secondary peripheral device 408, a peripheral device 506, a peripheral device 606, an apparatus 1000, and/or a device 1100) performs operations associated with extended personal area network time synchronization between a wireless communication device.

As shown in FIG. 9, in some aspects, process 900 may include receiving, from an AP, an XPAN synchronization message pair that indicates a WCD is a transmission source of the XPAN synchronization message pair, the XPAN synchronization message pair including a first XPAN synchronization message and a second XPAN synchronization message, the receiving comprising receiving the first XPAN synchronization message at a first time and the second XPAN synchronization message at a second time (block 910). For example, the peripheral device (e.g., using reception component 1002 and/or communication manager 1006, depicted in FIG. 10) may receive, from an AP, an XPAN synchronization message pair that indicates a WCD is a transmission source of the XPAN synchronization message pair, the XPAN synchronization message pair including a first XPAN synchronization message and a second XPAN synchronization message, the receiving comprising receiving the first XPAN synchronization message at a first time and the second XPAN synchronization message at a second time, as described above.

As further shown in FIG. 9, in some aspects, process 900 may include transmitting, to the AP, an XPAN synchronization response message pair that is addressed to the WCD and is based at least in part on the XPAN synchronization message pair, the XPAN synchronization response message pair including a first XPAN synchronization response message and a second XPAN synchronization response message (block 920). For example, the peripheral device (e.g., using transmission component 1004 and/or communication manager 1006, depicted in FIG. 10) may transmit, to the AP, an XPAN synchronization response message pair that is addressed to the WCD and is based at least in part on the XPAN synchronization message pair, the XPAN synchronization response message pair including a first XPAN synchronization response message and a second XPAN synchronization response message, as described above.

Process 900 may include additional aspects, such as any single aspect or any combination of aspects described below and/or in connection with one or more other processes described elsewhere herein.

In a first aspect, process 900 includes operating in an enabled power saving mode, and receiving the XPAN synchronization message pair includes receiving the XPAN synchronization message pair during an awake window.

In a second aspect, process 900 includes receiving, from the AP, user data that indicates a transmission source of the user data is the WCD.

In a third aspect, process 900 includes transmitting an indication of an expected wake up time associated with an awake window that is associated with operating in an enabled power saving mode.

In a fourth aspect, process 900 includes receiving, based at least in part on transmitting the XPAN synchronization response message pair, an XPAN synchronization follow up frame that indicates at least one timing metric.

In a fifth aspect, the first XPAN synchronization response message indicates a first duration between a start of an awake window and receiving the first XPAN synchronization message, and the second XPAN synchronization response message indicates a second duration between the start of the awake window and receiving the second XPAN synchronization message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
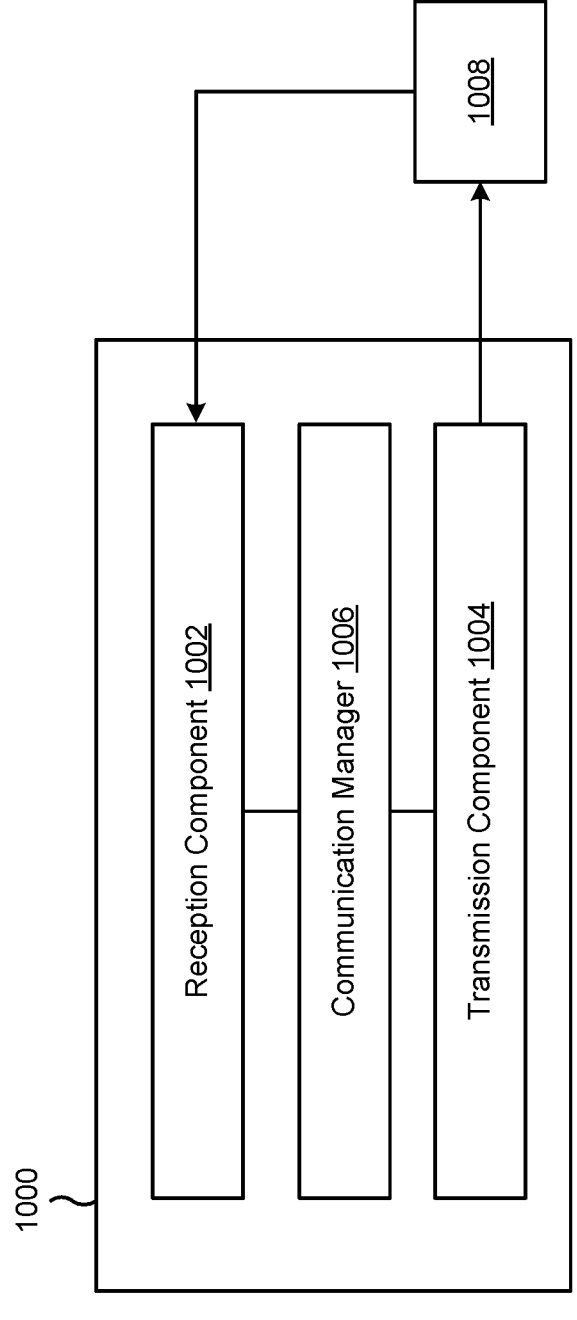
FIG. 10 is a diagram of an example apparatus for wireless communication, in accordance with the present disclosure.

FIG. 10 is a diagram of an example apparatus 1000 for wireless communication, in accordance with the present disclosure. In some aspects, the apparatus 1000 may be a WCD, or a WCD may include the apparatus 1000. In other aspects, the apparatus 1000 may be a peripheral device, or a peripheral device may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1000, such as a device 115 (e.g., a WCD), an AP 105, and/or a peripheral device (e.g., another device 115, a wireless earbud 130-*a*, and/or a wireless earbud 130-*b*), using the reception component 1002 and the transmission component 1004.

In some aspects, the apparatus 1000 may be configured to perform one or more operations described herein in connection with FIGS. 3B-8. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of device 1100 described in connection with FIG. 11. Additionally, or alternatively, one or more components shown in FIG. 10 may be implemented within one or more components described in connection with device 1100 described in connection with FIG. 11. Additionally, or alternatively, one or more components of the set of components may be implemented at least in part as software stored in one or more memories. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a multiple-input-multiple-output (MIMO) detector, a receive processor, a controller/ processor, a memory, or a combination thereof, of the WCD described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/ processor, a memory, or a combination thereof, of the WCD described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

In some aspects, the communication manager 1006 may be implemented as at least in part of a device 115, a WCD 402, a WCD 504, a WCD 504, an apparatus 1000, and/or a device 1100. Accordingly, the communication manager 1006 may perform a clock tracking procedure that includes transmitting, to an AP, an XPAN synchronization message pair that is addressed to a peripheral device associated with the WCD. The XPAN synchronization message pair may include a first XPAN synchronization message and a second XPAN synchronization message, and the transmitting the XPAN synchronization message pair ma include transmitting the first XPAN synchronization message at a first time and the second XPAN synchronization message at a second time. The clock tracking procedure may include receiving, from the AP, an XPAN synchronization response message pair that is associated with the XPAN synchronization message pair, and the XPAN synchronization response message pair may include a first XPAN synchronization response message and a second XPAN synchronization response message. The first XPAN synchronization response message may be based at least in part on the first XPAN synchronization message and the second XPAN synchronization response message may be based at least in part on the second XPAN synchronization message. The communication manager 1006 may transmit, by way of the transmission component 1004 and to the AP, user data that is addressed to the peripheral device at a time that is based at least in part on an estimated awake window, the estimated awake window being based at least in part on the XPAN synchronization response message pair.

The communication manager 1006 may calculate a third time that is associated with transmitting the user data and is based at least in part on reducing an awake duration of the peripheral device, and transmitting the user data includes transmitting the user data based at least in part on the third time. Alternatively, or additionally, the communication manager 1006 may calculate an estimated network jitter based at least in part on the WCD operating in a first disabled power saving mode and the peripheral device operating in a second disabled power saving mode. In some aspects, the communication manager 1006 may detect a trigger event that is associated with a network delay, and calculating the estimated network jitter includes calculating the estimated network jitter based at least in part on detecting the trigger event.

The communication manager 1006 may receive, by way of the reception component 1002, an indication of an expected wake up time associated with an awake window that is associated with the peripheral device operating with an enabled power saving mode. In some aspects, the communication manager 1006 may commence the clock tracking procedure based at least in part on receiving the indication. Alternatively or additionally, the communication manager 1006 may calculate one or more timing metrics associated with the estimated awake window based at least in part on the XPAN synchronization response message pair.

In some aspects, the communication manager 1006 may calculate, as a first timing metric of one or more timing metrics, a first RTT based at least in part on the first XPAN synchronization message and the first XPAN synchronization response message. Alternatively, or additionally, the communication manager may calculate, as a second timing metric of the one or more timing metrics, a second RTT based at least in part on the second XPAN synchronization message and the second XPAN synchronization response message. In some aspects, the communication manager 1006 may calculate, as a third timing metric of the one or more timing metrics, a start time associated with the estimated awake window based at least in part on the first RTT and the second RTT. The communication manager 1006 may update at least one of an estimated network jitter, or an estimated network delay based at least in part on at least one of the first RTT, the second RTT, or the start time.

The communication manager 1006 may transmit, by way of the transmission component 1004 and based at least in part on receiving the XPAN synchronization response message pair, an XPAN synchronization follow up frame that indicates at least one timing metric that is associated with the estimated awake window. Alternatively, or additionally, the communication manager 1006 may operate in an enabled power saving mode that is associated with a device iteratively transitioning between an active state and a sleep state. The communication manager 1006 may iteratively perform the clock tracking procedure at each N-th transition to the active state.

In some aspects, the communication manager 1006 may generate one or more sub-interval encoded audio data packets, and the user data includes the one or more sub-interval encoded audio data packets.

In some aspects, the communication manager 1006 may be implemented as at least part of a device 115, a primary peripheral device 404, a secondary peripheral device 408, a peripheral device 506, a peripheral device 606, an apparatus 1000, and/or a device 1100. Accordingly, the communication manager 1006 may receive, by way of the reception component 1002 and from an AP, an XPAN synchronization message pair that indicates that a WCD is a transmission source of the XPAN synchronization message pair, the XPAN synchronization message pair including a first XPAN synchronization message and a second XPAN synchronization message, the receiving comprising receiving the first XPAN synchronization message at a first time and the second XPAN synchronization message at a second time. The communication manager 1006 may transmit, by way of the transmission component 1004 and to the AP, an XPAN synchronization response message pair that is addressed to the WCD and is based at least in part on the XPAN synchronization message pair, the XPAN synchronization response message pair including a first XPAN synchronization response message and a second XPAN synchronization response message.

The communication manager 1006 may operate in an enabled power saving mode. In some aspects, the communication manager 1006 may receive, by way of the reception component 1002, from the AP, user data that indicates a transmission source of the user data is the WCD.

The communication manager 1006 may transmit, by way of the transmission component 1004, an indication of an expected wake up time associated with an awake window that is associated with operating with an enabled power saving mode. Alternatively, or additionally, the communication manager 1006 may receive, by way of the reception component 1002 and based at least in part on transmitting the XPAN synchronization response message pair, an XPAN synchronization follow up frame that indicates at least one timing metric.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
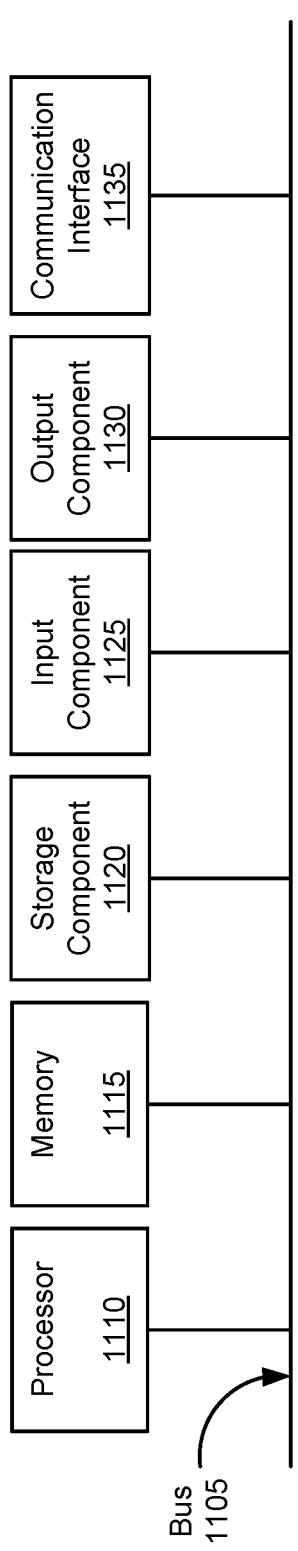
FIG. 11 is a diagram illustrating example components of a device, in accordance with the present disclosure.

FIG. 11 is a diagram illustrating example components of a device 1100, in accordance with the present disclosure. Device 1100 may correspond to a first wireless communication device (e.g., an AP 102 and/or an STA 104) and/or a second wireless communication device (e.g., a STA 104). In some aspects, the first wireless communication device and/or the second wireless communication device may include one or more devices 1100 and/or one or more components of device 1100. As shown in FIG. 11, device 1100 may include a bus 1105, a processor 1110, a memory 1115, a storage component 1120, an input component 1125, an output component 1130, and/or a communication interface 1135.

Bus 1105 includes a component that permits communication among the components of device 1100. Processor 1110 is implemented in hardware, firmware, or a combination of hardware and software. Processor 1110 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 1110 includes one or more processors capable of being programmed to perform a function. Memory 1115 includes a random access memory (RAM), a read only memory (ROM), and/or another type of dynamic or static storage device (e.g., a flash memory, a magnetic memory, and/or an optical memory) that stores information and/or instructions for use by processor 1110.

Storage component 1120 stores information and/or software related to the operation and use of device 1100. For example, storage component 1120 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 1125 includes a component that permits device 1100 to receive information, such as via user input (e.g., a touch screen display, a keyboard, a keypad, a mouse, a button, a switch, and/or a microphone). Additionally, or alternatively, input component 1125 may include a component for determining a position or a location of device 1100 (e.g., a global positioning system (GPS) component or a global navigation satellite system (GNSS) component) and/or a sensor for sensing information (e.g., an accelerometer, a gyroscope, an actuator, or another type of position or environment sensor). Output component 1130 includes a component that provides output information from device 1100 (e.g., a display, a speaker, a haptic feedback component, and/or an audio or visual indicator).

Communication interface 1135 includes a transceiver-like component (e.g., a transceiver and/or a separate receiver and transmitter) that enables device 1100 to communicate with other devices, such as via a wired connection, a wireless connection, or a combination of wired and wireless connections. Communication interface 1135 may permit device 1100 to receive information from another device and/or provide information to another device. For example, communication interface 1135 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

Device 1100 may perform one or more processes described herein. Device 1100 may perform these processes based on processor 1110 executing software instructions stored by a non-transitory computer-readable medium, such as memory 1115 and/or storage component 1120. A computer-readable medium is defined herein as a non-transitory memory device. A memory device includes memory space within a single physical storage device or memory space spread across multiple physical storage devices.

Software instructions may be read into memory 1115 and/or storage component 1120 from another computer-readable medium or from another device via communication interface 1135. When executed, software instructions stored in memory 1115 and/or storage component 1120 may cause processor 1110 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, the device 1100 includes means for performing a clock tracking procedure that includes: means for transmitting, to an AP, an XPAN synchronization message pair that is addressed to a peripheral device associated with the WCD, the XPAN synchronization message pair including a first XPAN synchronization message and a second XPAN synchronization message, the transmitting the XPAN synchronization message pair comprising transmitting the first XPAN synchronization message at a first time and the second XPAN synchronization message at a second time, means for receiving, from the AP, an XPAN synchronization response message pair that is associated with the XPAN synchronization message pair, the XPAN synchronization response message pair including a first XPAN synchronization response message and a second XPAN synchronization response message, the first XPAN synchronization response message being based at least in part on the first XPAN synchronization message and the second XPAN synchronization response message being based at least in part on the second XPAN synchronization message, and means for transmitting, to the AP, user data that is addressed to the peripheral device at a time that is based at least in part on an estimated awake window, the estimated awake window being based at least in part on the XPAN synchronization response message pair.

In some aspects, the device 1100 includes means for receiving, from an AP, an XPAN synchronization message pair that indicates a WCD is a transmission source of the XPAN synchronization message pair, the XPAN synchronization message pair including a first XPAN synchronization message and a second XPAN synchronization message, the receiving comprising receiving the first XPAN synchronization message at a first time and the second XPAN synchronization message at a second time; and/or means for transmitting, to the AP, an XPAN synchronization response message pair that is addressed to the WCD and is based at least in part on the XPAN synchronization message pair, the XPAN synchronization response message pair including a first XPAN synchronization response message and a second XPAN synchronization response message.

In some aspects, the means for the device 100 to perform operations described herein may include, for example, one or more of communication manager 140, processor 1110, memory 1115, storage component 1120, input component 1125, output component 1130, and/or communication interface 1135.

The number and arrangement of components shown in FIG. 11 are provided as an example. In practice, device 1100 may include additional components, fewer components, different components, or differently arranged components than those shown in FIG. 11. Additionally, or alternatively, a set of components (e.g., one or more components) of device 1100 may perform one or more functions described as being performed by another set of components of device 1100.

The following provides an overview of some Aspects of the present disclosure:

Aspect 1: A method of wireless communication performed by a wireless communication device (WCD), comprising: performing a clock tracking procedure that comprises: transmitting, to an access point (AP), an extended personal area network (XPAN) synchronization message pair that is addressed to a peripheral device associated with the WCD, the XPAN synchronization message pair including a first XPAN synchronization message and a second XPAN synchronization message, the transmitting the XPAN synchronization message pair comprising transmitting the first XPAN synchronization message at a first time and the second XPAN synchronization message at a second time, receiving, from the AP, an XPAN synchronization response message pair that is associated with the XPAN synchronization message pair, the XPAN synchronization response message pair including a first XPAN synchronization response message and a second XPAN synchronization response message, the first XPAN synchronization response message being based at least in part on the first XPAN synchronization message and the second XPAN synchronization response message being based at least in part on the second XPAN synchronization message, and transmitting, to the AP, user data that is addressed to the peripheral device at a time that is based at least in part on an estimated awake window, the estimated awake window being based at least in part on the XPAN synchronization response message pair.

Aspect 2: The method of Aspect 1, further comprising: calculating a third time that is associated with transmitting the user data and is based at least in part on reducing an awake duration of the peripheral device, wherein transmitting the user data comprises transmitting the user data based at least in part on the third time.

Aspect 3: The method of any of Aspects 1-2, further comprising: calculating an estimated network jitter based at least in part on the WCD operating in a first disabled power saving mode and the peripheral device operating in a second disabled power saving mode.

Aspect 4: The method of Aspect 3, wherein a time span between the first time and the second time is based at least in part on at least one of: the estimated network jitter, a duration of the estimated awake window, or a coder-decoder (codec) bitrate associated with the user data.

Aspect 5: The method of Aspect 3, further comprising: detecting a trigger event that is associated with a network delay, wherein calculating the estimated network jitter comprises calculating the estimated network jitter based at least in part on detecting the trigger event.

Aspect 6: The method of any of Aspects 1-5, further comprising: receiving an indication of an expected wake up time associated with an awake window that is associated with the peripheral device operating with an enabled power saving mode; and commencing the clock tracking procedure based at least in part on receiving the indication.

Aspect 7: The method of any of Aspects 1-6, further comprising: calculating one or more timing metrics associated with the estimated awake window based at least in part on the XPAN synchronization response message pair.

Aspect 8: The method of any one of Aspects 1-7, wherein calculating the one or more timing metrics comprises: calculating, as a first timing metric of the one or more timing metrics, a first round trip time (RTT) based at least in part on the first XPAN synchronization message and the first XPAN synchronization response message; calculating, as a second timing metric of the one or more timing metrics, a second RTT based at least in part on the second XPAN synchronization message and the second XPAN synchronization response message; and calculating, as a third timing metric of the one or more timing metrics, a start time associated with the estimated awake window based at least in part on the first RTT and the second RTT.

Aspect 9: The method of Aspect 8, further comprising: updating at least one of: an estimated network jitter, or an estimated network delay, based at least in part on at least one of: the first RTT, the second RTT, or the start time.

Aspect 10: The method of any of Aspects 1-9, further comprising: transmitting, based at least in part on receiving the XPAN synchronization response message pair, an XPAN synchronization follow up frame that indicates at least one timing metric that is associated with the estimated awake window.

Aspect 11: The method of any of Aspects 1-10, wherein the clock tracking procedure further comprises: selecting the first time based at least in part on configuring the first XPAN synchronization message to arrive at the peripheral device at a first time offset that is relative to an estimated start time of the estimated awake window; and selecting the second time based at least in part on configuring the second XPAN synchronization message to arrive at the peripheral device at a second time offset that is relative to a duration of the estimated awake window.

Aspect 12: The method of any of Aspects 1-11, further comprising: operating in an enabled power saving mode that is associated with the WCD iteratively transitioning between an active state and a sleep state; and iteratively performing the clock tracking procedure at each N-th transition to the active state, wherein N is an integer.

Aspect 13: The method of any of Aspects 1-12, wherein the first XPAN synchronization response message indicates a first duration between a start of the estimated awake window and receipt of the first XPAN synchronization message by the peripheral device, and wherein the second XPAN synchronization response message indicates a second duration between the start of the estimated awake window and receipt of the second XPAN synchronization message by the peripheral device.

Aspect 14: The method of any of Aspects 1-13, further comprising: generating one or more sub-interval encoded audio data packets, wherein the user data comprises the one or more sub-interval encoded audio data packets.

Aspect 15: A method of wireless communication performed by peripheral device, comprising: receiving, from an access point (AP), an extended personal area network (XPAN) synchronization message pair that indicates a wireless communication device (WCD) is a transmission source of the XPAN synchronization message pair, the XPAN synchronization message pair including a first XPAN synchronization message and a second XPAN synchronization message, the receiving comprising receiving the first XPAN synchronization message at a first time and the second XPAN synchronization message at a second time; and transmitting, to the AP, an XPAN synchronization response message pair that is addressed to the WCD and is based at least in part on the XPAN synchronization message pair, the XPAN synchronization response message pair including a first XPAN synchronization response message and a second XPAN synchronization response message.

Aspect 16: The method of Aspect 15, further comprising: operating in an enabled power saving mode, wherein receiving the XPAN synchronization message pair comprises:

receiving the XPAN synchronization message pair during an awake window, wherein receiving the XPAN synchronization message pair comprises: receiving the XPAN synchronization message pair during an awake window.

Aspect 17: The method of any of Aspects 15-16, further comprising: receiving, from the AP, user data that indicates a transmission source of the user data is the WCD.

Aspect 18: The method of any of Aspects 15-17, further comprising: transmitting an indication of an expected wake up time associated with an awake window that is associated with operating with an enabled power saving mode.

Aspect 19: The method of any of Aspects 15-18, further comprising: receiving, based at least in part on transmitting the XPAN synchronization response message pair, an XPAN synchronization follow up frame that indicates at least one timing metric.

Aspect 20: The method of any of Aspects 15-19, wherein the first XPAN synchronization response message indicates a first duration between a start of an awake window and receiving the first XPAN synchronization message, and wherein the second XPAN synchronization response message indicates a second duration between the start of the awake window and receiving the second XPAN synchronization message.

Aspect 21: An apparatus for wireless communication at a device, comprising a processor; memory coupled with the processor; and instructions stored in the memory and executable by the processor to cause the apparatus to perform the method of one or more of Aspects 1-14.

Aspect 22: An apparatus for wireless communication at a device, comprising a processor; memory coupled with the processor; and instructions stored in the memory and executable by the processor to cause the apparatus to perform the method of one or more of Aspects 15-20.

Aspect 23: A device for wireless communication, comprising a memory and one or more processors coupled to the memory, the one or more processors configured to perform the method of one or more of Aspects 1-14.

Aspect 24: A device for wireless communication, comprising a memory and one or more processors coupled to the memory, the one or more processors configured to perform the method of one or more of Aspects 15-20.

Aspect 25: An apparatus for wireless communication, comprising at least one means for performing the method of one or more of Aspects 1-14.

Aspect 26: An apparatus for wireless communication, comprising at least one means for performing the method of one or more of Aspects 15-20.

Aspect 27: A non-transitory computer-readable medium storing code for wireless communication, the code comprising instructions executable by a processor to perform the method of one or more of Aspects 1-14.

Aspect 28: A non-transitory computer-readable medium storing code for wireless communication, the code comprising instructions executable by a processor to perform the method of one or more of Aspects 50-20.

Aspect 29: A non-transitory computer-readable medium storing a set of instructions for wireless communication, the set of instructions comprising one or more instructions that, when executed by one or more processors of a device, cause the device to perform the method of one or more of Aspects 1-14.

Aspect 30: A non-transitory computer-readable medium storing a set of instructions for wireless communication, the set of instructions comprising one or more instructions that, when executed by one or more processors of a device, cause the device to perform the method of one or more of Aspects 15-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a wireless communication device (WCD), comprising:
   a memory; and
   one or more processors, coupled to the memory, configured, individually or collectively, to:
   perform a clock tracking procedure that comprises:
      transmit, to an access point (AP), an extended personal area network (XPAN) synchronization message pair that is addressed to a peripheral device associated with the WCD, the XPAN synchronization message pair including a first XPAN synchronization message and a second XPAN synchronization message, the one or more processors configured to transmit the first XPAN synchronization message at a first time and the second XPAN synchronization message at a second time,
      receive, from the AP, an XPAN synchronization response message pair that is associated with the XPAN synchronization message pair, the XPAN synchronization response message pair including a first XPAN synchronization response message and a second XPAN synchronization response message, the first XPAN synchronization response message being is based at least in part on the first XPAN synchronization message and the second XPAN synchronization response message being based at least in part on the second XPAN synchronization message,
      transmit, to the AP, user data that is addressed to the peripheral device at a time that is based at least in part on an estimated awake window, the estimated awake window being based at least in part on the XPAN synchronization response message pair;
      select the first time based at least in part on configuring the first XPAN synchronization message to arrive at the peripheral device at a first time offset that is relative to an estimated start time of the estimated awake window; and
      select the second time based at least in part on configuring the second XPAN synchronization message to arrive at the peripheral device at a second time offset that is relative to a duration of the estimated awake window.

2. The apparatus of claim 1, wherein the one or more processors are further configured to:
   calculate a third time that is associated with transmitting the user data and is based at least in part on reducing an awake duration of the peripheral device,
   wherein the one or more processors, to transmit the user data, are configured to transmit the user data based at least in part on the third time.

3. The apparatus of claim 1, wherein the one or more processors are further configured to:
   calculate an estimated network jitter based at least in part on the WCD operating in a first disabled power saving mode and the peripheral device operating in a second disabled power saving mode.

4. The apparatus of claim 1, wherein the one or more processors are further configured to:
   receive an indication of an expected wake up time associated with an awake window that is associated with the peripheral device operating with an enabled power saving mode; and
   commence the clock tracking procedure based at least in part on receiving the indication.

5. The apparatus of claim 1, wherein the one or more processors are further configured to:
   calculate one or more timing metrics associated with the estimated awake window based at least in part on the XPAN synchronization response message pair.

6. The apparatus of claim 5, wherein the one or more processors, to calculate the one or more timing metrics, are configured to:
   calculate, as a first timing metric of the one or more timing metrics, a first round trip time RTT) based at least in part on the first XPAN synchronization message and the first XPAN synchronization response message;
   calculate, as a second timing metric of the one or more timing metrics, a second RTT based at least in part on the second XPAN synchronization message and the second XPAN synchronization response message; and
   calculate, as a third timing metric of the one or more timing metrics, a start time associated with the estimated awake window based at least in part on the first RTT and the second RTT.

7. The apparatus of claim 1, wherein the one or more processors are further configured to:
   transmit, based at least in part on receiving the XPAN synchronization response message pair, an XPAN synchronization follow up frame that indicates at least one timing metric that is associated with the estimated awake window.

8. The apparatus of claim 1, wherein the one or more processors are further configured to:
   operate in an enabled power saving mode that is associated with the WCD iteratively transitioning between an active state and a sleep state; and
   iteratively perform the clock tracking procedure at each N-th transition to the active state, wherein Nis an integer.

9. The apparatus of claim 1, wherein the first XPAN synchronization response message indicates a first duration between a start of the estimated awake window and receipt of the first XPAN synchronization message by the peripheral device, and
   wherein the second XPAN synchronization response message indicates a second duration between the start of the estimated awake window and receipt of the second XPAN synchronization message by the peripheral device.

10. An apparatus for wireless communication at a peripheral device, comprising:
   a memory; and
   one or more processors, coupled to the memory, configured to:
   receive, from an access point (AP), an extended personal area network (XPAN) synchronization message pair that indicate a wireless communication device (WCD) is a transmission source of the XPAN synchronization message pair, the XPAN synchronization message pair including a first XPAN synchronization message and a second XPAN synchronization message, the one or more processors configured to receive the first XPAN synchronization message at a first time and the second XPAN synchronization message at a second time;

transmit, to the AP, an XPAN synchronization response message pair that is addressed to the WCD and is based at least in part on the XPAN synchronization message pair, the XPAN synchronization response message pair including a first XPAN synchronization response message and a second XPAN synchronization response message; and receive, based at least in part on transmitting the XPAN synchronization response message pair, an XPAN synchronization follow up frame that indicates at least one timing metric.

11. The apparatus of claim 10, wherein the one or more processors are further configured to:

operate in an enabled power saving mode, wherein the one or more processors, to receive the XPAN synchronization message pair, are configured to:

receive the XPAN synchronization message pair during an awake window.

12. The apparatus of claim 10, wherein the one or more processors are further configured to:

receive, from the AP, user data that indicates a transmission source of the user data is the WCD.

13. The apparatus of claim 10, wherein the one or more processors are further configured to:

transmit an indication of an expected wake up time associated with an awake window that is associated with operating with an enabled power saving mode.

14. The apparatus of claim 10, wherein the first XPAN synchronization response message indicates a first duration between a start of an awake window and receiving the first XPAN synchronization message, and wherein the second XPAN synchronization response message indicates a second duration between the start of the awake window and receiving the second XPAN synchronization message.

15. A method of wireless communication performed by a wireless communication device (WCD), comprising:

performing a clock tracking procedure that comprises:

transmitting, to an access point (AP), an extended personal area network (XPAN) synchronization message pair that is addressed to a peripheral device associated with the WCD, the XPAN synchronization message pair including a first XPAN synchronization message and a second XPAN synchronization message, the transmitting the XPAN synchronization message pair comprising transmitting the first XPAN synchronization message at a first time and the second XPAN synchronization message at a second time, receiving, from the AP, an XPAN synchronization response message pair that is associated with the XPAN synchronization message pair, the XPAN synchronization response message pair including a first XPAN synchronization response message and a second XPAN synchronization response message, the first XPAN synchronization response message being is based at least in part on the first XPAN synchronization message and the second XPAN synchronization response message being based at least in part on the second XPAN synchronization message, transmitting, to the AP, user data that is addressed to the peripheral device at a time that is based at least in part on an estimated awake window, the estimated awake window being based at least in part on the XPAN synchronization response message pair;

selecting the first time based at least in part on configuring the first XPAN synchronization message to arrive at the peripheral device at a first time offset that is relative to an estimated start time of the estimated awake window; and selecting the second time based at least in part on configuring the second XPAN synchronization message to arrive at the peripheral device at a second time offset that is relative to a duration of the estimated awake window.

16. The method of claim 15, further comprising:

calculating a third time that is associated with transmitting the user data and is based at least in part on reducing an awake duration of the peripheral device, wherein transmitting the user data comprises transmitting the user data based at least in part on the third time.

17. The method of claim 15, further comprising:

calculating an estimated network jitter based at least in part on the WCD operating in a first disabled power saving mode and the peripheral device operating in a second disabled power saving mode.

18. The method of claim 15, further comprising:

receiving an indication of an expected wake up time associated with an awake window that is associated with the peripheral device operating with an enabled power saving mode; and commencing the clock tracking procedure based at least in part on receiving the indication.

19. The method of claim 15, further comprising:

calculating, as a first timing metric associated with the estimated awake window, a first round trip time (RTT) based at least in part on the first XPAN synchronization message and the first XPAN synchronization response message;

calculating, as a second timing metric associated with the estimated awake window, a second RTT based at least in part on the second XPAN synchronization message and the second XPAN synchronization response message; and calculating, as a third timing metric of the one or more timing metrics, a start time associated with the estimated awake window based at least in part on the first RTT and the second RTT.

20. The method of claim 15, further comprising:

transmitting, based at least in part on receiving the XPAN synchronization response message pair, an XPAN synchronization follow up frame that indicates at least one timing metric that is associated with the estimated awake window.

21. The method of claim 15, further comprising:

operating in an enabled power saving mode that is associated with the WCD iteratively transitioning between an active state and a sleep state; and iteratively performing the clock tracking procedure at each N-th transition to the active state, wherein N is an integer.

22. The method of claim 15, wherein the first XPAN synchronization response message indicates a first duration between a start of the estimated awake window and receipt of the first XPAN synchronization message by the peripheral device, and wherein the second XPAN synchronization response message indicates a second duration between the start of the estimated awake window and receipt of the second XPAN synchronization message by the peripheral device.

23. The method of claim 15, further comprising:

generating one or more sub-interval encoded audio data packets, wherein the user data comprises the one or more sub-interval encoded audio data packets.

24. A method of wireless communication performed by peripheral device, comprising:

receiving, from an access point (AP), an extended personal area network (XPAN) synchronization message pair that indicate a wireless communication device (WCD) is a transmission source of the XPAN synchronization message pair, the XPAN synchronization message pair including a first XPAN synchronization message and a second XPAN synchronization message, the receiving comprising receiving the first XPAN synchronization message at a first time and the second XPAN synchronization message at a second time;

transmitting, to the AP, an XPAN synchronization response message pair that is addressed to the WCD and is based at least in part on the XPAN synchronization message pair, the XPAN synchronization response message pair including a first XPAN synchronization response message and a second XPAN synchronization response message; and receiving, based at least in part on transmitting the XPAN synchronization response message pair, an XPAN synchronization follow up frame that indicates at least one timing metric.

25. The method of claim 24, further comprising:

transmitting an indication of an expected wake up time associated with an awake window that is associated with operating with an enabled power saving mode.

26. The method of claim 24, wherein the first XPAN synchronization response message indicates a first duration between a start of an awake window and receiving the first XPAN synchronization message, and wherein the second XPAN synchronization response message indicates a second duration between the start of the awake window and receiving the second XPAN synchronization message.

* * * * *